US011346318B2

(12) United States Patent
Glugla et al.

(10) Patent No.: US 11,346,318 B2
(45) Date of Patent: *May 31, 2022

(54) SYSTEMS AND METHODS FOR IGNITION COIL MULTIPLEXING IN A PRECHAMBER SYSTEM

(71) Applicant: Ford Global Technologies, LLC, Dearborn, MI (US)

(72) Inventors: Chris Paul Glugla, Macomb, MI (US); Michael Damian Czekala, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/172,977

(22) Filed: Feb. 10, 2021

(65) Prior Publication Data

US 2021/0246862 A1  Aug. 12, 2021

Related U.S. Application Data

(63) Continuation of application No. 16/788,468, filed on Feb. 12, 2020, now Pat. No. 10,947,948.

(51) Int. Cl.
| F02P 15/02 | (2006.01) |
| F02P 5/145 | (2006.01) |
| F02B 19/12 | (2006.01) |
| F02P 15/08 | (2006.01) |
| F02P 3/04 | (2006.01) |
| F02P 5/15 | (2006.01) |
| F02D 41/14 | (2006.01) |

(52) U.S. Cl.
CPC .............. *F02P 15/02* (2013.01); *F02B 19/12* (2013.01); *F02P 3/04* (2013.01); *F02P 5/145* (2013.01); *F02P 15/08* (2013.01); *F02D 41/1454* (2013.01); *F02D 2200/021* (2013.01); *F02D 2200/0406* (2013.01); *F02D 2200/101* (2013.01); *F02P 5/1506* (2013.01)

(58) Field of Classification Search
CPC .............. F02P 15/02; F02P 3/04; F02B 19/12
See application file for complete search history.

(56) References Cited

U.S. PATENT DOCUMENTS 3,918,424 A    11/1975  Anderson et al.
4,078,533 A *   3/1978  Nohira .................... F02B 19/12
                                                       123/260

(Continued)

FOREIGN PATENT DOCUMENTS

CN          204082292 U      1/2015

*Primary Examiner* — Kevin R Steckbauer
(74) *Attorney, Agent, or Firm* — Geoffrey Brumbaugh; McCoy Russell LLP

(57) ABSTRACT

Methods and systems are provided for multiplexing ignition signals in an engine system based on engine operating conditions, each cylinder of the engine system including a main chamber spark plug and a pre-chamber system. In one example, a method may include multiplexing spark signals to a first spark plug and a second spark plug, the first spark plug coupled to a pre-chamber of a first cylinder and the second spark plug coupled to a main chamber of a second cylinder. In this way, one ignition coil may be used to actuate two different spark plugs coupled to separate cylinders.

18 Claims, 15 Drawing Sheets

(56) References Cited

U.S. PATENT DOCUMENTS

| | | | |
|---|---|---|---|
| 4,496,286 A * | 1/1985 | Gagnon | F02P 5/1516 417/22 |
| 4,901,687 A | 2/1990 | Jones | |
| 5,031,401 A | 7/1991 | Hinderks | |
| 5,269,650 A | 12/1993 | Benson | |
| 5,400,760 A * | 3/1995 | Miyata | F02P 15/08 123/630 |
| 5,445,122 A * | 8/1995 | Gerhard | F02P 15/08 123/310 |
| 5,619,975 A * | 4/1997 | Schmidt | G01M 15/11 123/644 |
| 6,189,522 B1 * | 2/2001 | Moriya | F02P 15/08 123/643 |
| 6,293,095 B1 | 9/2001 | Yamamoto et al. | |
| 6,357,418 B1 * | 3/2002 | Uemura | F02D 37/02 123/406.58 |
| 6,425,383 B1 * | 7/2002 | Raeske | F02P 7/035 123/643 |
| 6,487,854 B2 | 12/2002 | Maus | |
| 6,536,406 B2 * | 3/2003 | Matsubara | F02P 9/007 123/310 |
| 7,299,121 B2 * | 11/2007 | Uruno | F02P 5/1518 701/101 |
| 7,377,261 B2 | 5/2008 | Sukegawa et al. | |
| 7,794,671 B2 | 9/2010 | Kariya et al. | |
| 7,992,542 B2 * | 8/2011 | Glugla | F02P 15/08 123/406.2 |
| 8,146,555 B2 | 4/2012 | Solomon et al. | |
| 8,276,564 B2 * | 10/2012 | Petruska | F02P 15/02 123/406.12 |
| 8,490,598 B2 * | 7/2013 | Qu | F02P 15/10 123/406.2 |
| 8,931,457 B2 * | 1/2015 | Petruska | F02P 15/02 123/406.12 |
| 9,353,674 B2 | 5/2016 | Bunce et al. | |
| 9,488,150 B2 * | 11/2016 | Koenen | F02P 3/0407 |
| 10,018,104 B2 | 7/2018 | Grover, Jr. et al. | |
| 10,247,089 B1 | 4/2019 | Wicks et al. | |
| 10,364,738 B2 | 7/2019 | VanDerWege | |
| 10,400,696 B2 | 9/2019 | Blaxill et al. | |
| 10,634,041 B2 * | 4/2020 | Koenen | F02P 15/08 |
| 11,156,198 B1 * | 10/2021 | Glugla | F02P 5/045 |
| 2001/0017125 A1 * | 8/2001 | Matsubara | F02P 15/08 123/310 |
| 2006/0235601 A1 * | 10/2006 | Uruno | F02P 15/08 701/102 |
| 2009/0229569 A1 * | 9/2009 | Glugla | F02P 15/08 123/406.2 |
| 2011/0041803 A1 * | 2/2011 | Qu | F02P 17/12 123/406.2 |
| 2011/0041804 A1 * | 2/2011 | Petruska | F02P 3/01 123/406.12 |
| 2011/0255208 A1 * | 10/2011 | Petruska | F02P 3/01 361/263 |
| 2013/0104845 A1 * | 5/2013 | Koenen | F02P 1/083 123/406.12 |
| 2013/0284148 A1 * | 10/2013 | Qu | F02P 15/10 123/406.19 |
| 2015/0167583 A1 | 6/2015 | Sakamoto et al. | |
| 2016/0076425 A1 | 3/2016 | Goffe | |
| 2017/0022958 A1 * | 1/2017 | Koenen | F02P 1/083 |
| 2017/0138330 A1 * | 5/2017 | Koenen | F02B 23/08 |
| 2018/0156179 A1 * | 6/2018 | Koenen | F02P 1/083 |
| 2019/0078498 A1 | 3/2019 | Bedogni et al. | |

* cited by examiner

SYSTEMS AND METHODS FOR IGNITION COIL MULTIPLEXING IN A PRECHAMBER SYSTEM

CROSS REFERENCE TO RELATED APPLICATIONS

The present application is a continuation of U.S. Non-Provisional patent application Ser. No. 16/788,468, entitled "SYSTEMS AND METHODS FOR IGNITION COIL MULTIPLEXING IN A PRECHAMBER SYSTEM", and filed on Feb. 12, 2020. The entire contents of the above-listed application are hereby incorporated by reference for all purposes.

FIELD

The present description relates generally to methods and systems for engines having a pre-chamber system.

BACKGROUND/SUMMARY

An internal combustion engine combusts an air-fuel mixture within cylinders to produce torque, which may be used to propel a vehicle. In some such engines, an ignition spark is used to ignite the air-fuel mixture within each cylinder during a compression stroke. For example, each cylinder may include a spark plug for directly igniting the air-fuel mixture within the cylinder. In other examples, the air-fuel mixture within the cylinder may be ignited by jets of hot gas and flame from a pre-combustion chamber, referred to herein as a pre-chamber. The pre-chamber may be a walled chamber located in a clearance volume of the cylinder and may include a spark plug, an $O_2$ or air injector, and a fuel injector. During engine operation, a first air-fuel mixture is introduced into the pre-chamber, and a second air-fuel mixture is introduced into the cylinder. When pre-chamber ignition is indicated, the spark plug in the pre-chamber actuates, igniting the first air-fuel mixture. As the first air-fuel mixture combusts, jets of flame and hot gas may exit the pre-chamber and enter the cylinder via one or more holes in the pre-chamber walls. These jets ignite the second air-fuel mixture in the cylinder to produce torque.

Pre-chamber ignition may offer performance and efficiency increases during some operating conditions. For example, a cylinder with pre-chamber ignition may operate with a higher (e.g., leaner) air-fuel ratio (AFR), which may lead to lower fuel consumption in the cylinder with pre-chamber ignition. In other examples, a cylinder with pre-chamber ignition may produce more power due to an increased burn rate in the cylinder.

However, during some operating conditions, such as low engine load operation, pre-chamber systems may experience increased performance issues, such as engine knock and misfire, for example. To address the issues associated with pre-chamber ignition during certain engine operating conditions, some pre-chamber systems may further include cylinder (e.g., main chamber) spark plugs, which may additionally or alternatively provide an ignition spark during some engine operating modes. As an example, during low load operation, firing a cylinder spark plug may initiate combustion in the cylinder, while during a high load operation, a pre-chamber combustion event may initiate combustion in the cylinder. Further, in some operating conditions, both the cylinder spark plug and the pre-chamber combustion event may be used to initiate combustion in the cylinder. However, including an additional spark plug in each cylinder typically requires twice as many ignition coils, which may increase production and repair costs. Further, each ignition coil may require a separate communication channel with a vehicle controller, which may increase an amount of controller processing resources used during engine operation.

The inventors herein have advantageously recognized the above issues, and have developed a method to at least partially address them. In one example, the issues described above may be addressed by a method, comprising: multiplexing spark signals to a first spark plug and a second spark plug, the first spark plug coupled to a pre-chamber of a first cylinder and the second spark plug coupled to a main chamber of a second cylinder. In this way, a number of ignition coils in an ignition system may be decreased, decreasing cost and complexity, while ignition system flexibility may be increased, increasing engine performance over a wide range of operating conditions.

As one example, multiplexing spark signals to the first spark plug (e.g., a pre-chamber spark plug of the first cylinder) and the second spark plug (e.g., a main chamber spark plug of the first cylinder) may include actuating both of the first spark plug and the second spark plug via a first ignition coil, the first ignition coil electrically coupled to both the first spark plug and the second spark plug. Thus, when the first ignition coil is actuated, both the first spark plug and the second spark plug may fire, the first spark plug providing a spark to the pre-chamber of the first cylinder and the second spark plug providing a spark to the main chamber of the second cylinder. Further, as an example, the method may further include multiplexing spark signals to a third spark plug and a fourth spark plug, the third spark plug coupled to a main chamber of the first cylinder and the fourth spark plug coupled to a pre-chamber of the second cylinder. In particular, multiplexing spark signals to the third spark plug (e.g., a main chamber spark plug of the first cylinder) and the fourth spark plug (e.g., a pre-chamber spark plug of the second cylinder) may include actuating both of the third spark plug and the fourth spark plug via a second ignition coil, the second ignition coil electrically coupled to both the third spark plug and the fourth spark plug. Further, actuating the second ignition coil may include firing the third spark plug and the fourth spark plug, the third spark plug providing a spark to the main chamber of the first cylinder and the fourth spark plug providing a spark to the pre-chamber of the second cylinder.

As another example, the method may further include actuating the first ignition coil, coupled to the first spark plug and the second spark plug, at a first engine position of an engine cycle and actuating the second ignition coil, coupled to the third spark plug and the fourth spark plug, at a second engine position of the engine cycle. As a first example, the first engine position may be during an exhaust stroke of the first cylinder and a compression stroke of the second cylinder, and the second engine position may be during the compression stroke of the first cylinder and the exhaust stroke of the second cylinder. As such, actuating the first ignition coil at the first engine position may provide an ignition spark to the second cylinder via the main chamber spark plug of the second cylinder (e.g., the second spark plug) and may provide a waste spark to the first cylinder via the pre-chamber spark plug of the first cylinder (e.g., the first spark plug). Additionally, actuating the second ignition coil at the second engine position may provide an ignition spark to the first cylinder via the main chamber spark plug of the first cylinder (e.g., the third spark plug) and may provide a waste spark to the second cylinder via the pre-chamber spark plug of the second cylinder (e.g., the fourth spark plug). Thus, each ignition coil may be actuated once per engine cycle, and ignition may be provided to each cylinder via only the main chamber spark plug of the cylinder. The first example may comprise operating in a first ignition mode.

As a second example, the first engine position may be during the compression stroke of the first cylinder and the exhaust stroke of the second cylinder, and the second engine position may be during an exhaust stroke of the first cylinder and a compression stroke of the second cylinder. As such, actuating the first ignition coil at the first engine position may provide an ignition spark to the first cylinder via the pre-chamber spark plug of the first cylinder (e.g., the first spark plug) and may provide a waste spark to the second cylinder via the main chamber spark plug of the second cylinder (e.g., the second spark plug). Additionally, actuating the second ignition coil at the second engine position may provide an ignition spark to the second cylinder via the pre-chamber spark plug of the second cylinder (e.g., the fourth spark plug) and may provide a waste spark to the first cylinder via the main chamber spark plug of the first cylinder (e.g., the third spark plug). Thus, each ignition coil may be actuated once per engine cycle, ignition may be provided to each cylinder via only the pre-chamber spark plug of the cylinder. The second example may comprise operating in a second ignition mode.

As a third example, the first engine position and the second engine position both may be during the compression stroke of the first cylinder and the exhaust stroke of the second cylinder. In some examples, the first engine position and the second engine position may be a same engine position. In other examples, the first engine position may be before the second engine position or after the second engine position. The third example may further include actuating the first ignition coil at a third engine position and actuating the second ignition coil at a fourth engine position. For example, the third engine position and the fourth engine position may both be during the exhaust stroke of the first cylinder and the compression stroke of the second cylinder. In some examples, the third engine position and the fourth engine position may be a same engine position. In other examples, the third engine position may be before the fourth engine position or after the fourth engine position. Thus, each ignition coil may be actuated twice per engine cycle, and ignition may be provided to each cylinder via both the main chamber spark plug and the pre-chamber spark plug of the cylinder. The third example may comprise operating in a third ignition mode.

As a further example, a number of crank angle degrees between the first engine position and the second engine position may be determined based on engine operating conditions, such as to increase a burn rate of the cylinders and/or to reduce an incidence of misfire. In particular, the engine operating conditions may include a position of an exhaust gas recirculation (EGR) valve, an engine load, an engine temperature, a desired air-fuel ratio (AFR), and an engine speed. For example, by adjusting the number of crank angle degrees between the first engine position and the second engine position based on these engine operating conditions, the engine may be transition between the three ignition modes, each of the three ignition modes providing distinct performance characteristics.

In this way, a system including a multiplexed pre-chamber and main chamber ignition system may be operated in a plurality of ignition modes based on engine operating conditions in order to provide desired combustion characteristics for a desired engine performance. By multiplexing a pre-chamber spark plug of a first cylinder to a main chamber spark plug of a second cylinder and multiplexing a main chamber spark plug of the first cylinder to a pre-chamber spark plug of the second cylinder, a total number of ignition coils included in the system may be decreased, reducing cost and complexity of the engine system. Further, by adjusting relative actuation timings of the pre-chamber spark plug and the main chamber spark plug based on engine operating conditions such as engine load, for example, a cylinder burn rate may be increased, which may increase a power output and a fuel efficiency of the engine, while an incidence of misfire may be decreased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
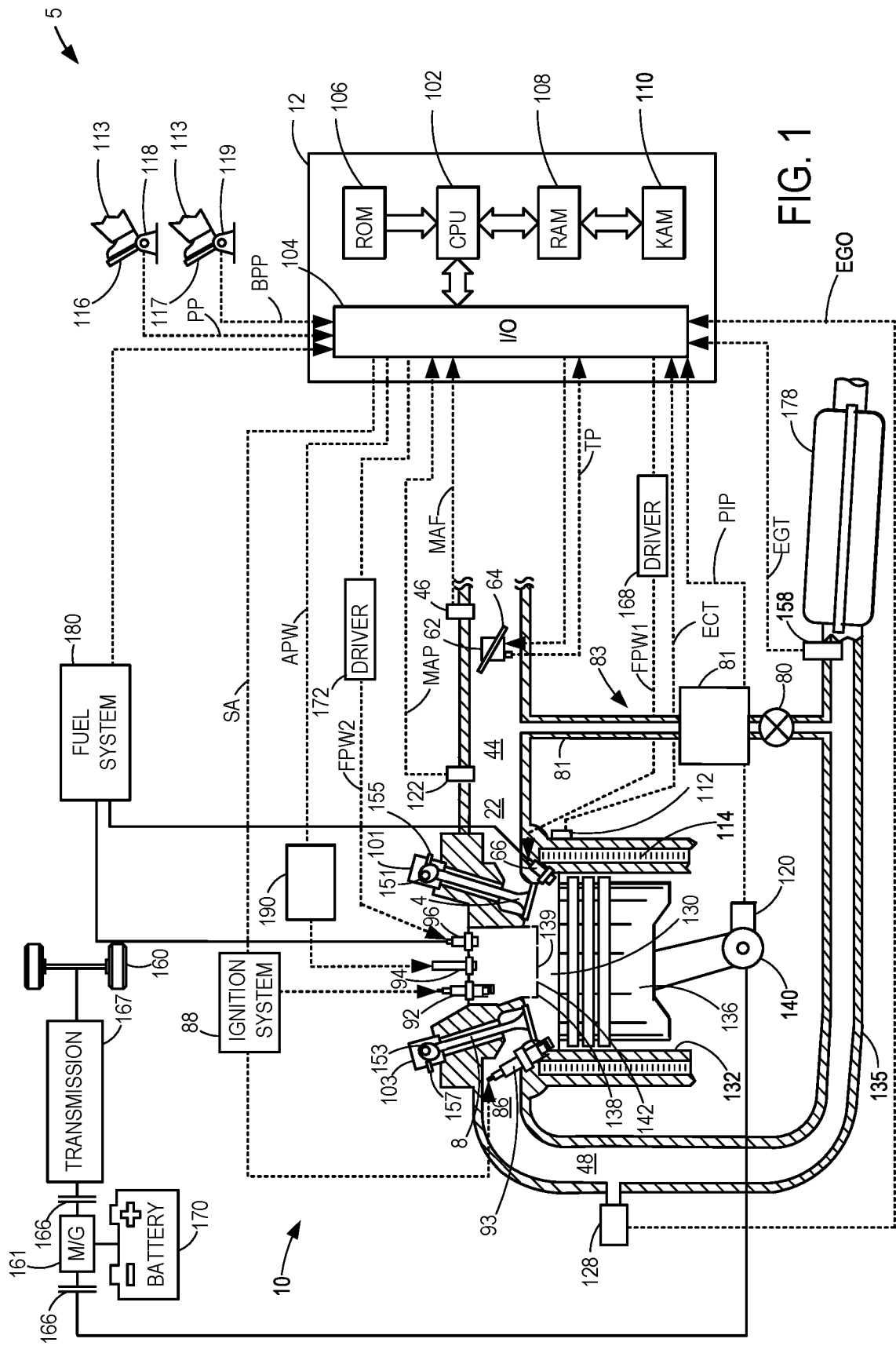
FIG. 1 shows a schematic depiction of a cylinder with a pre-chamber system in an engine of a vehicle system.
Figure 2:
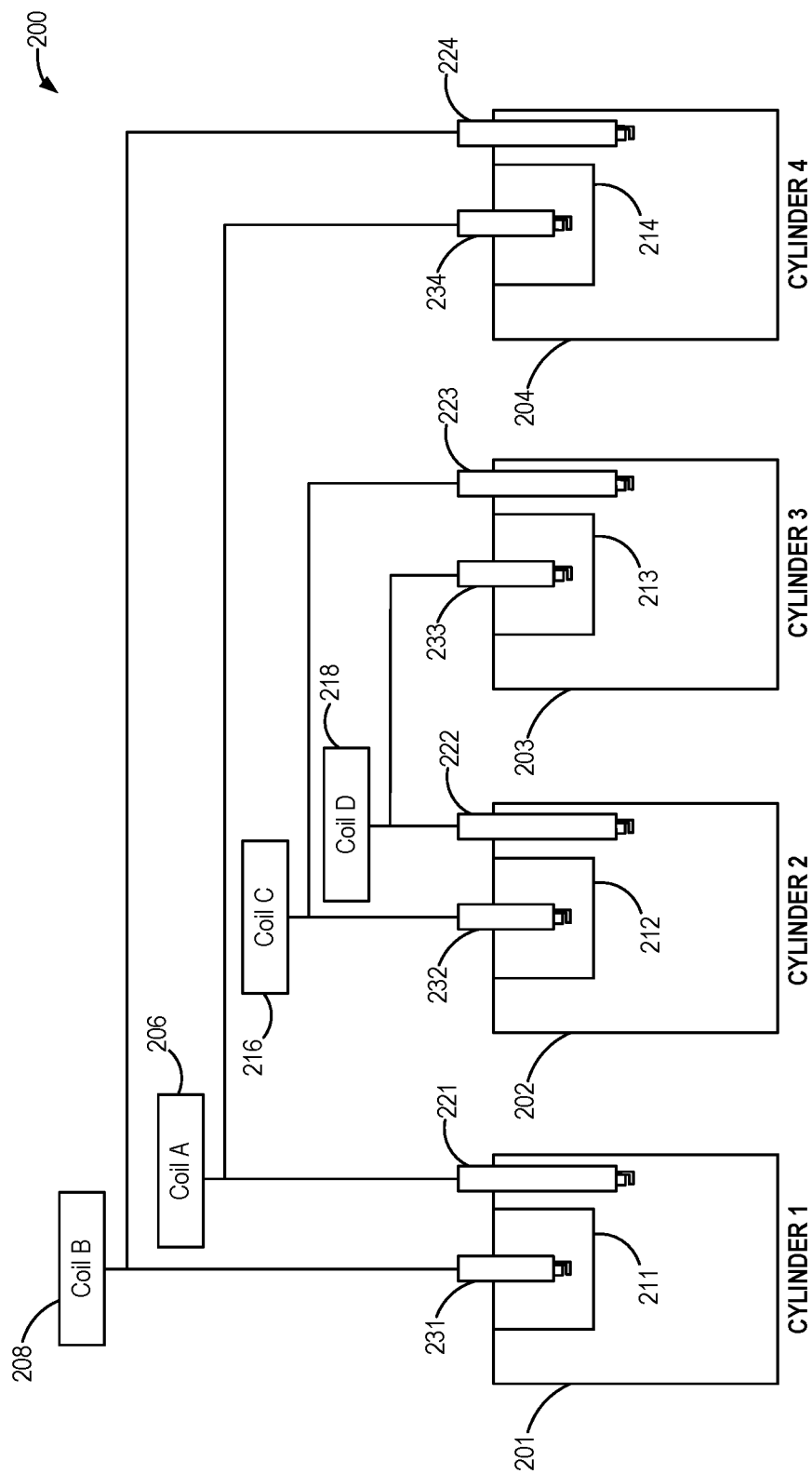
FIG. 2 shows a schematic depiction of a spark plug and ignition coil configuration in an engine system having a multiplexed pre-chamber and main chamber ignition system.

The following description relates to systems and methods for operating an engine having a multiplexed pre-chamber and main chamber ignition system. Each cylinder of the engine may have a cylinder configuration including a main chamber spark plug coupled directly to the cylinder and an active pre-chamber that includes a fuel injector, a pre-chamber spark plug, and an air injector, such as shown in FIG. 1. Further, the ignition system may be configured such that one ignition coil provides voltage to both a pre-chamber spark plug of a first cylinder and a main chamber spark plug of a second cylinder, as shown in FIG. 2. To increase engine performance, the ignition system with multiplexed ignition coils may be operated according to the method of FIG. 3 to provide pre-chamber and/or main chamber spark ignition based on engine operating conditions. For example, the pre-chamber may be operated to provide an ignition source to the cylinder according to the method of FIG. 4. FIGS. 5A-9B show different example spark patterns that may be selected to ignite an air-fuel ratio within a cylinder via pre-chamber ignition, main chamber spark ignition, or both, while FIG. 10 shows a prophetic example timeline for adjusting the selected spark pattern based on engine operating conditions.

Turning now to the figures, FIG. 1 shows a partial view of a single cylinder 130 of an internal combustion engine 10 that may be included in a vehicle 5. Internal combustion engine 10 may be a multi-cylinder engine. Cylinder (e.g., combustion chamber) 130 includes a coolant sleeve 114 and cylinder walls 132, with a piston 136 positioned therein and connected to a crankshaft 140. Combustion chamber 130 is shown communicating with an intake manifold 44 via an intake valve 4 and an intake port 22 and with an exhaust manifold 48 via an exhaust valve 8 and an exhaust port 86. A throttle 62 including a throttle plate 64 may be provided in an intake passage upstream of intake manifold 44 for varying a flow rate and/or pressure of intake air provided to the engine cylinders.

In the depicted view, intake valve 4 and exhaust valve 8 are located at an upper region of combustion chamber 130. Intake valve 4 and exhaust valve 8 may be controlled by a controller 12 using respective cam actuation systems including one or more cams. The cam actuation systems may utilize one or more of variable displacement engine (VDE), cam profile switching (CPS), variable cam timing (VCT), variable valve timing (VVT), and/or variable valve lift (VVL) systems to vary valve operation. In the depicted example, intake valve 4 is controlled by an intake cam 151, and exhaust valve 8 is controlled by an exhaust cam 153. The intake cam 151 may be actuated via an intake valve timing actuator 101 and the exhaust cam 153 may be actuated via an exhaust valve timing actuator 103 according to set intake and exhaust valve timings, respectively. In some examples, the intake valves and exhaust valves may be deactivated via the intake valve timing actuator 101 and exhaust valve timing actuator 103, respectively. The position of intake cam 151 and exhaust cam 153 may be determined by camshaft position sensors 155 and 157, respectively.

In some examples, the intake and/or exhaust valve may be controlled by electric valve actuation. For example, cylinder 130 may alternatively include an intake valve controlled via electric valve actuation and an exhaust valve controlled via cam actuation, including CPS and/or VCT systems. In still other examples, the intake and exhaust valves may be controlled by a common valve actuator or actuation system or a variable valve timing actuator or actuation system. The various valve control systems may be used to vary a timing, open duration, and lift of intake valve 4 and exhaust valve 8.

Cylinder 130 may have a compression ratio, which is a ratio of volumes when piston 136 is at bottom dead center to top dead center. Conventionally, the compression ratio is in a range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

As a non-limiting example, cylinder 130 is shown including a cylinder fuel injector 66. Fuel injector 66 is shown coupled directly to combustion chamber 130 for injecting fuel directly therein in proportion to a pulse-width of a signal FPW1 received from controller 12 via an electronic driver 168. In this manner, fuel injector 66 provides what is known as direct injection (hereafter also referred to as "DI") of fuel into cylinder 130. In another example, injector 66 may be a port injector providing fuel into the intake port upstream of cylinder 130. Further, while FIG. 1 shows fuel injected to the cylinder via a single injector, the engine may alternatively be operated by injecting fuel via multiple injectors, such as one direct injector and one port injector. For example, both port and direct injectors may be included in a configuration that is known as port fuel and direct injection (PFDI). In such a configuration, controller 12 may vary a relative amount of injection from each injector.

Fuel may be delivered to fuel injector 66 from a high pressure fuel system 180 including one or more fuel tanks, fuel pumps, and a fuel rail. Alternatively, fuel may be delivered by a single stage fuel pump at a lower pressure. Further, while not shown, the fuel tanks may include a pressure transducer providing a signal to controller 12. Fuel tanks in fuel system 180 may hold fuel with different fuel qualities, such as different fuel compositions. These differences may include different alcohol content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of ethanol and water, a mixture of water and methanol, a mixture of alcohols, etc. In this way, air and fuel are delivered to cylinder 130, which may produce a combustible air-fuel mixture.

Fuel may be delivered by fuel injector 66 to cylinder 130 during a single cycle of the cylinder. Further, the distribution and/or relative amount of fuel delivered from cylinder fuel injector 66 may vary with operating conditions. Furthermore, for a single combustion event, multiple injections of the delivered fuel may be performed per cycle. The multiple injections may be performed during the compression stroke, intake stroke, or any appropriate combination thereof.

In the example shown in FIG. 1, each cylinder 130 of engine 10 includes a pre-chamber 138 for initiating combustion and/or increasing a combustion performance. Pre-chamber 138 is defined by pre-chamber walls 139 and includes a pre-chamber spark plug 92, an air injector 94, and a pre-chamber fuel injector 96. Air injector 94 may be configured to inject air and/or oxygen into the pre-chamber. In some examples, air injector 94 is an electromagnetic (e.g., solenoid) injector. One or more of ambient air, oxygen, and another combustible gas may be delivered to air injector 94 by a pre-chamber air source 190. Note that in relation to pre-chamber air source 190, the term "air" may refer herein to ambient air, oxygen (e.g., $O_2$), hydrogen (e.g., $H_2$), or a mixture of such gases. In some examples, the pre-chamber air source 190 supplies air injector 94 with ambient air from an air intake passage of the engine. In other examples, pre-chamber air source 190 supplies air injector 94 with onboard-generated $O_2$, which may be stored in a pressurized tank. Pre-chamber fuel injector 96 is shown coupled directly to pre-chamber 138 for injecting fuel directly therein in proportion to a pulse-width of a signal FPW2 received from controller 12 via an electronic driver 172. Fuel may be provided to pre-chamber fuel injector 96 by high-pressure fuel system 180, described above. Alternatively, fuel may be provided to pre-chamber fuel injector 96 from a dedicated pre-chamber fuel system that may be included within or distinct from high-pressure fuel system 180. Thus, both air and fuel are delivered to pre-chamber 138, which may produce an air-fuel mixture with an air-fuel ratio (AFR) that may differ from an AFR in cylinder 130.

Further, the pre-chamber walls 139 may include a plurality of openings, such as an opening 142 shown in FIG. 1. Opening 142 provides an orifice between pre-chamber 138 and cylinder 130, fluidically coupling an interior of pre-chamber 138 to an interior of cylinder 130. As such, during some conditions, gases may flow between the interior of pre-chamber 138 and the interior of cylinder 130. For example, gases (e.g., air, fuel, and/or residual combustion gases) may flow through opening 142 with a directionality and rate based on a pressure difference across opening 142 (e.g., between the interior of pre-chamber 138 and the interior of cylinder 130). Opening 142 (along with any other openings in pre-chamber walls 139) may also provide an ignition flame from pre-chamber 138 to cylinder 130, as will be elaborated below.

An ignition system 88 may provide an ignition spark to pre-chamber 138 via pre-chamber spark plug 92 in response to a spark advance signal SA from controller 12, under select operating modes. A timing of signal SA may be adjusted based on engine operating conditions and a driver torque demand. For example, spark may be provided at maximum brake torque (MBT) timing to maximize engine power and efficiency. Controller 12 may input engine operating conditions, including engine speed, engine load, and exhaust gas AFR, into a look-up table, which may output the corresponding MBT timing for the input engine operating conditions. In other examples, spark may be retarded from MBT to prevent an occurrence of knock. In still other examples, spark may be retarded from MBT to reduce engine torque, such as due to a decrease in driver-demanded torque or a transmission gear shift event. When pre-chamber spark plug 92 provides the ignition spark to pre-chamber 138, the air-fuel mixture within the pre-chamber may combust, the increased pressure of combustion sending jets of flame into cylinder 130 via the plurality of openings in the pre-chamber walls 139, including opening 142. The plurality of openings may be arranged such that the jets of flame are evenly distributed in cylinder 130. The jets of flame may ignite the air-fuel mixture in cylinder 130, causing combustion.

In the example shown in FIG. 1, each cylinder 130 of engine 10 further includes a main chamber spark plug 93 (e.g., a cylinder spark plug) for initiating and/or increasing a rate of combustion. Main chamber spark plug 98 is directly coupled to the main combustion chamber (e.g., combustion chamber 130) of the cylinder. Ignition system 88 may provide an ignition spark to cylinder 130 via main chamber spark plug 93 in response to a spark advance signal SA from controller 12, under select operating modes. A timing of signal SA may be adjusted based on engine operating conditions and a driver torque demand. Thus, in the example shown in FIG. 1, cylinder 130 includes two distinct ignition sources (e.g., pre-chamber 138 and main chamber spark plug 93) for initiating combustion. One or both of the two distinct ignition sources may be used to combust an air-fuel mixture in the cylinder during engine operation, such as according to the method of FIG. 3.

After combustion, a mixture of exhaust gases from pre-chamber 138 and cylinder 130 may be exhausted from cylinder 130 to exhaust manifold 48 via opening of exhaust valve 8. An exhaust gas sensor 128 is shown coupled to exhaust manifold 48 upstream of an emission control device 178, coupled within an exhaust passage 135. Exhaust gas sensor 128 may be selected from among various suitable sensors for providing an indication of an exhaust gas AFR, such as a linear oxygen sensor or UEGO (universal or wide-range exhaust gas oxygen), a two-state oxygen sensor or EGO (as depicted), a HEGO (heated EGO), a NOx sensor, a HC sensor, or a CO sensor, for example. Emission control device 178 may be a three-way catalyst, a NOx trap, various other emission control devices, or combinations thereof.

External exhaust gas recirculation (EGR) may be provided to the engine via a high pressure EGR system 83, delivering exhaust gas from a zone of higher pressure in exhaust passage 135 to a zone of lower pressure in intake manifold 44, downstream of throttle 62, via an EGR passage 81. An amount EGR provided to intake manifold 44 may be varied by controller 12 via an EGR valve 80. For example, controller 12 may be configured to actuate and adjust a position of EGR valve 80 to adjust the amount of exhaust gas flowing through EGR passage 81. EGR valve 80 may be adjusted between a fully closed position, in which exhaust gas flow through EGR passage 81 is blocked, and a fully open position, in which exhaust gas flow through the EGR passage is enabled. As an example, EGR valve 80 may be continuously variable between the fully closed position and the fully open position. As such, the controller may increase a degree of opening of EGR valve 80 to increase an amount of EGR provided to intake manifold 44 and decrease the degree of opening of EGR valve 80 to decrease the amount of EGR provided to intake manifold 44. As an example, EGR valve 80 may be an electronically activated solenoid valve. In other examples, EGR valve 80 may be positioned by an incorporated stepper motor, which may be actuated by controller 12 to adjust the position of EGR valve 80 through a range of discreet steps (e.g., 52 steps), or EGR valve 80 may be another type of flow control valve. Further, EGR may be cooled via passing through EGR cooler 85 within EGR passage 81. EGR cooler 85 may reject heat from the EGR gases to engine coolant, for example.

Under some conditions, the EGR system may be used to regulate a temperature of the air and fuel mixture within the combustion chamber. Further, EGR may be desired to attain a desired engine dilution, thereby increasing fuel efficiency and emissions quality, such as emissions of nitrogen oxides. As an example, EGR may be requested at low-to-mid engine loads. Thus, it may be desirable to measure or estimate the EGR mass flow. EGR sensors may be arranged within EGR passage 81 and may provide an indication of one or more of mass flow, pressure, and temperature of the exhaust gas, for example. Additionally, EGR may be desired after emission control device 178 has attained its light-off temperature. An amount of EGR requested may be based on engine operating conditions, including engine load, engine speed, engine temperature, etc. For example, controller 12 may refer to a look-up table having the engine speed and load as the input and output a desired amount of EGR corresponding to the input engine speed-load. In another example, controller 12 may determine the desired amount of EGR (e.g., desired EGR flow rate) through logic rules that directly take into account parameters such as engine load, engine speed, engine temperature, etc. In still other examples, controller 12 may rely on a model that correlates a change in engine load with a change in a dilution requirement, and further correlates the change in the dilution requirement with a change in the amount of EGR requested. For example, as the engine load increases from a low load to a mid load, the amount of EGR requested may increase, and then as the engine load increases from a mid load to a high load, the amount of EGR requested may decrease. Controller 12 may further determine the amount of EGR requested by taking into account a best fuel economy mapping for a desired dilution rate. After determining the amount of EGR requested, controller 12 may refer to a look-up table having the requested amount of EGR as the input and a signal corresponding to a degree of opening to apply to the EGR valve (e.g., as sent to the stepper motor or other valve actuation device) as the output.

Engine 10 may be controlled at least partially by controller 12 and by input from a vehicle operator 113 via an accelerator pedal 116 and an accelerator pedal position sensor 118 and via a brake pedal 117 and a brake pedal position sensor 119. The accelerator pedal position sensor 118 may send a pedal position signal (PP) to controller 12 corresponding to a position of accelerator pedal 116, and the brake pedal position sensor 119 may send a brake pedal position (BPP) signal to controller 12 corresponding to a position of brake pedal 117. Controller 12 is shown in FIG. 1 as a microcomputer, including a microprocessor unit 102, input/output ports 104, an electronic storage medium for executable programs and calibration values shown as a read only memory 106 in this particular example, random access memory 108, keep alive memory 110, and a data bus. Storage medium read-only memory 106 can be programmed with computer readable data representing instructions executable by microprocessor 102 for performing the methods and routines described herein as well as other variants that are anticipated but not specifically listed.

Controller 12 may receive various signals from sensors coupled to engine 10, in addition to those signals previously discussed, including a measurement of inducted mass air flow (MAF) from a mass air flow sensor 46, an engine coolant temperature signal (ECT) from a temperature sensor 112 coupled to coolant sleeve 114, signal EGO from exhaust gas sensor 128, which may be used by controller 12 to determine the AFR of the exhaust gas, an exhaust gas temperature signal (EGT) from a temperature sensor 158 coupled to exhaust passage 135, a profile ignition pickup signal (PIP) from a Hall effect sensor 120 (or other type) coupled to crankshaft 140, a throttle position (TP) from a throttle position sensor coupled to throttle 62, and an absolute manifold pressure signal (MAP) from a MAP sensor 122 coupled to intake manifold 44. An engine speed signal, RPM, may be generated by controller 12 from signal PIP. The manifold pressure signal MAP from the manifold pressure sensor may be used to provide an indication of vacuum or pressure in the intake manifold.

Based on input from one or more of the above-mentioned sensors, controller 12 may adjust one or more actuators, such as cylinder fuel injector 66, throttle 62, main chamber spark plug 93, pre-chamber spark plug 92, pre-chamber fuel injector 96, pre-chamber air injector 94, the intake/exhaust valves and cams, etc. The controller may receive input data from the various sensors, process the input data, and trigger the actuators in response to the processed input data based on instruction or code programmed therein corresponding to one or more routines, examples of which is described with respect to FIGS. 3 and 4.

In some examples, vehicle 5 may be a hybrid vehicle with multiple sources of torque available to one or more vehicle wheels 160. In other examples, vehicle 5 is a conventional vehicle with only an engine. In the example shown in FIG. 1, the vehicle includes engine 10 and an electric machine 161. Electric machine 161 may be a motor or a motor/generator and thus may also be referred to herein as an electric motor. Electric machine 161 receives electrical power from a traction battery 170 to provide torque to vehicle wheels 160. Electric machine 161 may also be operated as a generator to provide electrical power to charge battery 170, for example, during a braking operation.

Crankshaft 140 of engine 10 and electric machine 161 are connected via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 130.

Turning now to FIG. 2, an example spark plug configuration of an engine system 200 is shown. In the example of FIG. 2, engine system 200 includes a multi-cylinder engine having four cylinders, including a cylinder 1, a cylinder 2, a cylinder 3, and a cylinder 4, and a multiplexed pre-chamber and main chamber ignition system 205. Although four cylinders are shown, in other examples, the engine may have more than four cylinders (e.g., six cylinders) or less than four cylinders (e.g., two cylinders). Each cylinder may be substantially identical to cylinder 130 shown in FIG. 1, including a main chamber and a pre-chamber. Specifically, cylinder 1 includes a first main chamber 201 and a first pre-chamber 211, cylinder 2 includes a second main chamber 202 and a second pre-chamber 212, cylinder 3 includes a third main chamber 203 and a third pre-chamber 213, and cylinder 4 includes a fourth main chamber 204 and a fourth pre-chamber 214. Each cylinder further includes a main chamber spark plug and a pre-chamber spark plug. That is, cylinder 1 includes a first main chamber spark plug 221 coupled to first main chamber 202 and a first pre-chamber spark plug 231 coupled to first pre-chamber 211, cylinder 2 includes a second main chamber spark plug 222 coupled to second main chamber 202 and a second pre-chamber spark plug 232 coupled to second pre-chamber 212, cylinder 3 includes a third main chamber spark plug 223 coupled to third main chamber 203 and a third pre-chamber spark plug 233 coupled to third pre-chamber 213, and cylinder 4 includes a fourth main chamber spark plug 224 coupled to fourth main chamber 204 and a fourth pre-chamber spark plug 234 coupled to fourth pre-chamber 214.

In the example of FIG. 2, multiplexed pre-chamber and main chamber ignition system 205 includes four ignition coils, each ignition coil providing voltage to two spark plugs of engine system 200. In particular, a first coil 206 ("coil A") provides voltage to first main chamber spark plug 221 and fourth pre-chamber spark plug 234 (e.g., to the main chamber spark plug of cylinder 1 and the pre-chamber spark plug of cylinder 4). Further, a second coil 208 ("coil B") provides voltage to first pre-chamber spark plug 231 and fourth main chamber spark plug 224 (e.g., to the pre-chamber spark plug of cylinder 1 and the main chamber spark plug of cylinder 4). Further still, a third coil 216 ("coil C") provides voltage to second pre-chamber spark plug 232 and third main chamber spark plug 223 (e.g., to the pre-chamber spark plug of cylinder 2 and the main chamber spark plug of cylinder 3). Further, a fourth coil 218 ("coil D") provides voltage to second main chamber spark plug 222 and third pre-chamber spark plug 233 (e.g., to the main chamber spark plug of cylinder 2 and the pre-chamber spark plug of cylinder 3).

Thus, as shown in FIG. 2, each of the ignition coils provides voltage to a pre-chamber spark plug and a main chamber spark plug of different cylinders, a configuration referred to herein as "multiplexed." As an example, each ignition coil may be connected to a main chamber spark plug with a coil on plug (e.g., COP) connection, while a high-tension lead may connect the coil to a pre-chamber spark plug. Actuating an ignition coil may cause each of the connected spark plugs to fire. For example, coil A may provide voltage to first main chamber spark plug 221 via a COP connection, while a high-tension lead may further connect coil A to fourth pre-chamber spark plug 234. Thus, actuating coil A causes first main chamber spark plug 221 and fourth pre-chamber spark plug 234 to fire substantially simultaneously. As used herein, substantially simultaneously (or simply "simultaneously") may refer to events occurring with no delay or with a negligible delay on the timescale of ignition timing.

The four cylinders of engine system 200 are grouped into cylinder pairs. Each cylinder pair shares two ignition coils, which together actuate firing of all four spark plugs of the cylinder pair. In the example of FIG. 2, cylinder 1 and cylinder 4 form a first cylinder pair, while cylinder 2 and cylinder 3 form a second cylinder pair. The cylinder pairs are grouped according to a firing order of the engine in order to provide ignition during a desired stroke of each cylinder. For example, an ignition spark may be desired during a compression stroke to produce torque, while a waste spark may be favorable during an exhaust stroke to release heat from the cylinder. The firing order of engine system 200 is 1-3-4-2, putting cylinder 1 in a compression stroke while cylinder 4 is in an exhaust stroke (and vice versa), and putting cylinder 2 in a compression stroke while cylinder 3 is in an exhaust stroke (and vice versa).

Therefore, actuating coil A during the compression stroke of cylinder 1 (e.g., the exhaust stroke of cylinder 4) fires first main chamber spark plug 221 to produce an ignition spark in cylinder 1 and fires fourth pre-chamber spark plug 234 to produce a waste spark in cylinder 4. Similarly, actuating coil A during the compression stroke of cylinder 4 (e.g., the exhaust stroke of cylinder 1) fires fourth pre-chamber spark plug 234 to produce an ignition spark in cylinder 4 and fires first main chamber spark plug 221 to produce a waste spark in cylinder 1. As another example, actuating coil B during the compression stroke of cylinder 1 (e.g., the exhaust stroke of cylinder 4) fires first pre-chamber spark plug 231 to produce an ignition spark in cylinder 1 and fires fourth main chamber spark plug 224 to produce a waste spark in cylinder 4. Actuating coil B during the compression stroke of cylinder 4 (e.g., the exhaust stroke of cylinder 1) fires fourth main chamber spark plug 224 to produce an ignition spark in cylinder 4 and fires first pre-chamber spark plug 231 to produce a waste spark in cylinder 1. As still another example, actuating coil C during the compression stroke of cylinder 2 (e.g., the exhaust stroke of cylinder 3) fires second pre-chamber spark plug 232 to produce an ignition spark in cylinder 2 and fires third main chamber spark plug 223 to produce a waste spark in cylinder 3. Actuating coil C during the compression stroke of cylinder 3 (e.g., the exhaust stroke of cylinder 2) fires third main chamber spark plug 223 to produce an ignition spark in cylinder 3 and fires second pre-chamber spark plug 232 to produce a waste spark in cylinder 2. As yet another example, actuating coil D during the compression stroke of cylinder 2 fires second main chamber spark plug 222 to produce an ignition spark in cylinder 2 and fires third pre-chamber spark plug 233 to produce a waste spark in cylinder 3. Actuating coil D during the compression stroke of cylinder 3 fires third pre-chamber spark plug 233 to produce an ignition spark in cylinder 3 and fires second main chamber spark plug 222 to produce a waste spark in cylinder 2. One or both coils of each cylinder pair may be actuated to provide ignition to one cylinder. When both coils are actuated, they may be actuated simultaneously or with a staggered timing, examples of which will be shown below with respect to FIGS. 7A-9B. As such, multiplexed pre-chamber and main chamber ignition system may be operated in a plurality of ignition modes, which will be described below with reference to FIGS. 3 and 7A-9B.

In this way, multiplexed pre-chamber and main chamber ignition system 205 may be flexibly operated to produce desired combustion properties. As one example, pre-chamber systems may experience performance issues, such as misfire, during low load operation, for example, which may cause undesirable noise, vibration, and handling issues. By including the main chamber (e.g., cylinder) spark plug in addition to the pre-chamber system, cylinder combustion performance may be increased. By multiplexing the ignition coils and using a single coil to fire both a main chamber spark plug of a first cylinder and a pre-chamber spark plug of a second, different cylinder, a number of ignition coils in the ignition system is decreased, decreasing vehicle costs and complexity.

Figure 3:
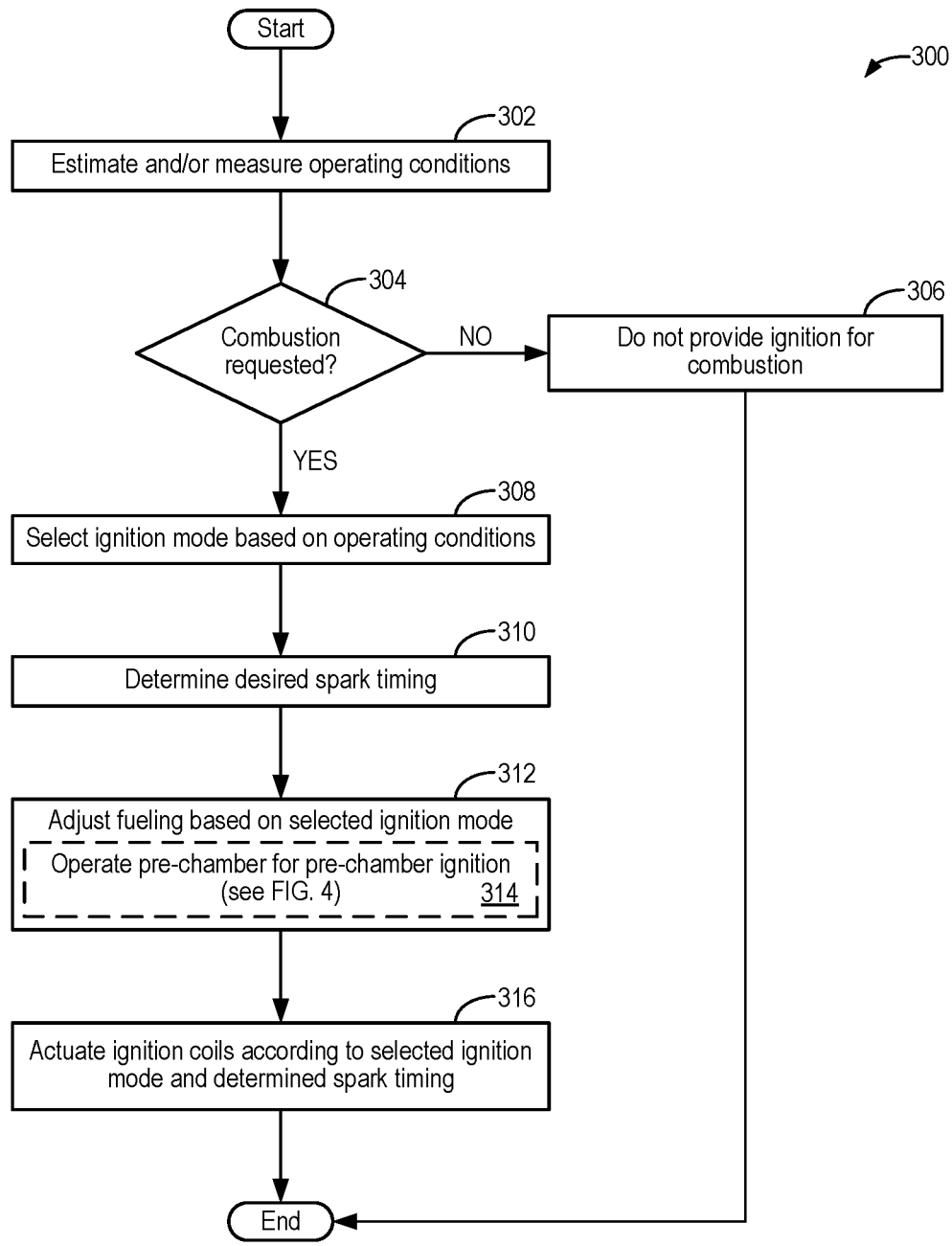
FIG. 3 depicts an example method for operating an engine with a multiplexed pre-chamber and main chamber ignition system.

FIG. 3 shows an example method for operating an engine having pre-chamber ignition and main chamber ignition, including multiplexed ignition coils. Method 300 will be described with respect to the cylinder configuration shown in FIG. 1 and the multiplexed pre-chamber and main chamber ignition system configuration shown in FIG. 2, although method 300 may be applied in other systems that include active pre-chamber ignition multiplexed to main chamber ignition. Instructions for carrying out method 300 and the rest of the methods included herein may be executed by a controller, such as controller 12 of FIG. 1, based on instructions stored on a memory of the controller and in conjunction with signals received from sensors of the engine system, such as the sensors described above with reference to FIG. 1. The controller may employ actuators of the engine, including a pre-chamber fuel injector (e.g., pre-chamber fuel injector 96 of FIG. 1), a pre-chamber spark plug (e.g., pre-chamber spark plug 92 of FIG. 1), a main chamber spark plug (e.g., main chamber spark plug 93 of FIG. 1), a cylinder fuel injector, cylinder valves, and a pre-chamber air injector (e.g., pre-chamber air injector 94 shown in FIG. 1) to adjust engine operation according to the methods described below.

At 302, method 300 includes estimating and/or measuring operating conditions. The operating conditions may include, for example, vehicle speed, engine speed, engine load, an engine temperature, an exhaust gas AFR, a position of an EGR valve (which may give an indication of an amount or rate of EGR provided), an accelerator pedal position, a desired cylinder AFR, a desired pre-chamber AFR, and a position of a throttle (e.g., throttle position). The operating conditions may be measured by one or more sensors communicatively coupled to the controller or may be inferred based on available data. For example, the accelerator pedal position may be measured by an accelerator pedal position sensor, such as accelerator pedal position sensor 118 of FIG. 1, and the brake pedal position may be measured by a brake pedal position sensor, such as brake pedal position sensor 119 of FIG. 1. Together, the accelerator pedal position and the brake pedal position may indicate a demanded amount of engine torque. As another example, the exhaust gas AFR may be determined based on an oxygen level detected by an exhaust gas oxygen sensor, such as exhaust gas sensor 128 of FIG. 1. Similarly, the throttle position may be measured using a throttle position sensor coupled to the throttle.

At 304, method 300 includes determining whether combustion is requested in the engine. In some examples, combustion may be requested during nominal engine operation to produce torque in at least one cylinder each engine cycle. For example, an ignition source may ignite an air-fuel mixture in each cylinder during a compression stroke of the cylinder to generate torque. For a four-stroke engine, a combustion cycle (e.g., a cylinder cycle) refers to a four stroke movement of a piston of a given cylinder, the four strokes including an intake stroke, the compression stroke, a power stroke, and an exhaust stroke, while an engine cycle refers to each cylinder undergoing one combustion event in a designated firing order (e.g., occurring over two full rotations of an engine crankshaft, or 720 crank angle degrees). Further, the combustion cycle of each cylinder may be staggered, such that a compression stroke of cylinder 1 may coincide with an exhaust stroke of cylinder 4, for example.

If combustion is not requested at 304, method 300 proceeds to 306 and includes not providing ignition for combustion. For example, combustion may not be requested when the engine is off (e.g., at a speed of zero) or during a fuel-cut event, where the engine operates at a non-zero speed but fueling is temporarily discontinued. Not providing ignition for combustion includes not actuating an ignition coil in for the purpose of igniting an air-fuel mixture in a cylinder, although in some examples, the ignition coil may be actuated for purposes other than ignition (e.g., spark plug heating and/or cleaning). After 306, method 300 ends.

If combustion is requested at 304, method 300 proceeds to 308 and includes selecting an ignition mode based on the operating conditions. The ignition mode may be selected from a plurality of possible ignition modes, including a first ignition mode wherein only the main chamber spark plug is used for ignition, a second ignition mode wherein only the pre-chamber spark plug is used for ignition, and a third ignition mode wherein both the main chamber spark plug and the pre-chamber spark plug are used for ignition. Within the third ignition mode, a spark timing of the main chamber spark plug and the pre-chamber spark plug may be adjusted relative to each other, as will be elaborated below at 310, to provide the main chamber and pre-chamber ignition sparks simultaneously or sequentially. Further, each ignition mode specifies the ignition coil or coils, and thereby the spark plug or spark plugs, actuated to produce combustion in a given cylinder.

Operating in each ignition mode also produces waste sparks. As described above with respect to FIG. 2, the cylinders are divided into cylinder pairs, and each cylinder pair includes two ignition coils that control firing of four spark plugs. Specifically, a first ignition coil actuates a main chamber spark plug of a first cylinder and a pre-chamber spark plug of a second cylinder, and a second ignition coil actuates a main chamber spark plug of the second cylinder and a pre-chamber spark plug of the first cylinder. Therefore, actuating one ignition coil produces one ignition spark for initiating combustion and producing torque (e.g., during the compression stroke of the first cylinder) and one waste spark that does not initiate combustion or produce torque (e.g., during the exhaust stroke of the second cylinder). As such, the first ignition mode includes producing a waste spark with only the pre-chamber spark plug, the second ignition mode includes producing a waste spark with only the main chamber spark plug, and the third ignition mode includes producing waste sparks with both the main chamber spark plug and the pre-chamber spark plug.

Each ignition mode may be further defined by when each spark plug fires relative to a position of the engine. In the third ignition mode, each spark plug may be fired twice during an engine cycle, while in the first and second ignition modes, each spark plug may be fired once during an engine cycle, with the cylinder stroke varying based on whether the given spark plug is used for ignition or not, as defined by whether the first ignition mode is selected or the second ignition mode is selected. Operating in a particular ignition mode may thus produce characteristic spark plug firing patterns, also referred to herein simply as spark patterns or firing patterns.

The operating conditions used to select between the different ignition modes may relate to engine performance demands and combustion stability, such as engine speed, engine load, the amount of EGR, the desired AFR, and the engine temperature. Thus, the ignition mode may be selected in order to achieve desired combustion characteristics, such as a desired burn rate. As an example, by providing ignition sparks from both the pre-chamber spark plug and the main chamber spark plug in the third ignition mode, the burn rate may be increased. Therefore, the controller may input the engine operating conditions (e.g., the engine speed, the engine load, the amount of EGR, the desired AFR, and the engine temperature) into one or more look up tables, functions, or maps, which may output the ignition mode that is expected achieve desired performance characteristics in the engine, such as the desired burn rate.

As one example, the first ignition mode may be selected responsive to a cold start condition. For example, the controller may select the first ignition mode when engine temperature is lower than a threshold engine temperature, and the threshold engine temperature is a non-zero value corresponding to the engine temperature below which the engine is in a cold start condition. For example, when the controller determines that engine temperature is lower than the threshold engine temperature, the controller may operate the engine in the first ignition mode. As another example, additionally or alternatively, the first ignition mode may be selected responsive to a low engine load condition. For example, the controller may select the first ignition mode when the engine load is lower than a first threshold engine load. The first threshold engine load may be a positive, non-zero value corresponding to an engine load below which cylinder ignition (e.g., operating in the first ignition mode) is indicated.

As another example, the second ignition mode may be selected responsive to a request to increase a catalyst temperature. For example, the controller may select the second ignition mode when a catalyst temperature falls below a threshold catalyst temperature for catalyst heating, and the threshold catalyst temperature is a positive, non-zero value corresponding to the catalyst temperature below which catalyst heating is may be requested. As an example, the controller may operate the engine in the second ignition mode when the catalyst temperature falls below the threshold catalyst temperature for catalyst heating. Additionally or alternatively, the second ignition mode may be selected responsive to the engine load increasing above the first threshold engine load, while remaining below a second threshold engine load. The second threshold engine load may be a positive, non-zero value corresponding to an engine load above which operating with both pre-chamber and cylinder ignition is indicated.

As still another example, the third ignition mode may be selected responsive to a high dilution rate. For example, an engine may operate with a high dilution rate when an external EGR system (e.g., such as high pressure EGR system 83 of FIG. 1) provides a relatively large amount of EGR to each cylinder. As a result, the third ignition mode may be indicated when an EGR valve opening exceeds a threshold EGR valve opening, and the threshold EGR valve opening is a positive, non-zero value corresponding to an amount of EGR valve opening above when the engine operates with a high dilution rate. Additionally or alternatively, as another example, the third ignition mode may be indicated when the engine load exceeds the second threshold engine load. For example, when the engine load exceeds the second threshold engine load, operating in the third ignition mode may be indicated. As another example, additionally or alternatively, the third ignition mode may be indicated based on an engine transient, as will be elaborated below.

In some examples, additional conditions may be used by the controller to select between the first ignition mode, the second ignition mode, and the third ignition mode. Further, because the third ignition mode includes using both the main chamber spark plug and the pre-chamber spark plug for ignition and because the timings of the main chamber ignition spark and the pre-chamber ignition spark can be adjusted relative to each other, the third ignition mode may include three sub-modes: a first sub-mode in which the main chamber spark plug and the pre-chamber spark plug fire simultaneously during the compression stroke, a second sub-mode in which the pre-chamber spark plug fires before the main chamber spark plug during the compression stroke, and a third sub-mode in which the main chamber spark plug fires before the pre-chamber spark plug during the compression stroke. As an example, the first sub-mode of the third ignition mode may be selected when the engine operates with a high dilution rate or additional combustion stability is requested. Additionally or alternatively, the first sub-mode of the third ignition mode may be selected during a cold start when the spark plug in the main chamber is initiating combustion and a pre-chamber firing is requested for increasing a temperature of the pre-chamber. As another example, the second sub-mode of the third ignition mode may be selected when a slow burn has occurred in a previous combustion cycle, or when a reduction in feed-gas hydrocarbon is requested, such as during a fuel shut-off event. Additionally or alternatively, the second sub-mode of the third ignition mode may be selected when there is an engine transient from low load operation to high load operation. As a further example, the third sub-mode of the third ignition mode may be selected when a very fast burn rate is requested, or knock avoidance is indicated. Additionally or alternatively, the third mode may be selected when there is an engine transient from high load operation to low load operation. As an alternative example, the third ignition mode may be selected when any of the above mentioned conditions for the three sub-modes are met, and the relative timings of the pre-chamber ignition spark and the main chamber ignition spark may be adjusted (as further described below at 310) without a specific sub-mode being selected. In some examples, spark firing may be staggered in order to decrease a burn rate in the cylinders in order to reduce noise, vibration, and handling (NVH) issues.

At 310, method 300 includes determining a desired spark timing for each spark plug used for initiating combustion. Determining the desired spark timing(s) may include determining when to ignite the air-fuel mixture in each cylinder relative to a position of a piston of each cylinder. In particular, the desired spark timing may be adjusted relative to the spark timing for maximum brake torque (MBT) based on engine operating conditions and the ignition mode selected at 308. For example, the spark timing(s) may be retarded relative to MBT timing to increase an exhaust gas temperature, while the spark timing(s) may be advanced closer to MBT timing to increase a torque output of the cylinder. As an example, the controller may input one or more engine operating conditions (e.g., the engine speed, the engine load, the exhaust gas temperature, the desired AFR, and the selected ignition mode) into one or more look-up tables, functions, or maps to determine the desired timing(s) for the firing event(s).

The desired spark timing(s) may include one or more of a desired pre-chamber spark timing and a desired main chamber spark timing. For example, when the first ignition mode is selected, only the desired main chamber spark timing may be determined, even though firing an ignition spark via the main chamber spark plug also results in the multiplexed pre-chamber spark plug simultaneously firing a waste spark. Similarly, when the second ignition mode is selected, only the desired pre-chamber spark timing may be determined, even though firing an ignition spark via the pre-chamber spark plug also results in the multiplexed pre-chamber spark plug simultaneously firing a waste spark. When the third ignition mode is selected, both of the desired pre-chamber spark timing and the desired main chamber spark timing may be determined.

When the third ignition mode is selected, the desired timings may incorporate a delay between main chamber and pre-chamber firing events. In other examples, a first desired spark timing may be determined, and a second desired spark timing may be determined as a function of the first desired spark timing and the delay. For example, the delay may be determined by inputting the one or more engine operating conditions into a look-up table, function, or map, which may output the delay between main chamber and pre-chamber ignition sparks. The delay may be a positive non-zero value, a negative non-zero value, or zero. Further, the delay may be a time duration or a number of crank angle degrees. Further still, the delay may define the pre-chamber spark timing relative to the main chamber spark timing or may define the main chamber spark timing relative to the pre-chamber spark timing. For example, when the delay defines the pre-chamber spark timing relative to the main chamber spark timing, a positive delay results in the desired prechamber spark timing being retarded from (e.g., occurring after) the desired main chamber spark timing, a negative delay results in the desired pre-chamber spark timing being advanced from (e.g., occurring before) the desired main chamber spark timing, and zero delay results in the desired pre-chamber spark timing and the desired main chamber spark timing occurring at a same spark timing. As another example, when the delay defines the main chamber spark timing relative to the pre-chamber spark timing, a positive delay results in the desired main chamber spark timing being retarded from (e.g., occurring after) the desired pre-chamber spark timing, a negative delay results in the desired main chamber spark timing being advanced from (e.g., occurring before) the desired pre-chamber spark timing, and zero delay results in the desired pre-chamber spark timing and the desired main chamber spark timing occurring at a same spark timing. Thus, in some examples, the desired pre-chamber spark timing may be different than the desired main chamber spark timing when both are used to initiate combustion during a single combustion cycle.

At 312, method 300 includes adjusting fueling based on the selected ignition mode, including adjusting one or more of an amount of fuel delivered to the pre-chamber and an amount of fuel delivered to the main chamber. For example, the controller may input the selected ignition mode and one or more engine operating conditions (e.g., the engine speed, the engine load, and the desired AFR) into one or more look-up tables, maps, or functions, which may output a desired amount of pre-chamber fuel and a desired amount of main chamber fuel. As one example, when the first ignition mode is selected, the desired amount of pre-chamber fuel may be zero, as the pre-chamber is not used to provide ignition. As another example, when either the first ignition mode or the second ignition mode is selected, the desired amount of pre-chamber fuel may be non-zero. Further, because combustion is requested, the desired amount of main chamber fuel is non-zero for every ignition mode.

Thus, method 300 at 312 optionally includes operating the pre-chamber for pre-chamber ignition, as indicated at 314. As will be further described below with respect to FIG. 4, operating the pre-chamber may not only include supplying the desired amount of pre-chamber fuel, but also injecting air into the pre-chamber. However, when pre-chamber ignition is not included in the ignition mode selected at 308, then 314 may be omitted.

In one example, the controller may adjust fueling by adjusting one or both of the pulse-width of an actuation signal sent to the main chamber fuel injector, such as FPW1 shown in FIG. 1, and an actuation signal sent to the pre-chamber fuel injector, such as FPW2 shown in FIG. 1. In one example, the controller may not supply fuel to the pre-chamber when the selected ignition mode does not include operating the pre-chamber during the compression stroke of the cylinder, as mentioned above. In another example, the controller may decrease an amount of fuel supplied to the main chamber when the selected ignition mode includes operating the pre-chamber during the compression stroke of the cylinder. In some examples, fuel may be provided to the pre-chamber during the exhaust stroke of a cylinder while operating in an ignition mode that includes providing a pre-chamber spark in the cylinder during an exhaust stroke of the cylinder, so that the pre-chamber spark during the exhaust stroke produces combustion in the pre-chamber during the exhaust stroke. For example, fuel may be provided to the pre-chamber and ignited during the exhaust stroke of the cylinder in order to increase a temperature of the pre-chamber, such as to increase combustion stability in the pre-chamber.

At 316, method 300 includes actuating the ignition coils according to the selected ignition mode and spark timing. For example, the controller may generate a control signal (e.g., signal SA) that is sent to an ignition system (e.g., ignition system 88 of FIG. 1) to operate in the ignition mode selected at 308 and actuate the appropriate ignition coil(s) to at the spark timing(s) determined at 310. Referring to the system shown in FIG. 2 and as mentioned above at 308, each ignition coil is connected to a main chamber spark plug and a pre-chamber spark plug of different cylinders in a cylinder pair. For the example cylinder pair including cylinder 1 and cylinder 4, coil A (e.g., first ignition coil 206) is connected to the main chamber spark plug of cylinder 1 (e.g., first main chamber spark plug 221) and to the pre-chamber spark plug of cylinder 4 (e.g., fourth pre-chamber spark plug 234). Further, coil B (e.g., second ignition coil 208) is connected to the pre-chamber spark plug of cylinder 1 (e.g., first pre-chamber spark plug 231) and to the main chamber spark plug of cylinder 4 (e.g., fourth main chamber spark plug 224). Thus, coil is actuated to produce combustion in cylinder 1 by firing the main chamber spark plug of cylinder 1 (which also produces a waste spark in cylinder 4 via the pre-chamber spark plug of cylinder 4) and/or to produce combustion in cylinder 4 by firing the pre-chamber spark plug of cylinder 4 (which also produces a waste spark in cylinder 1 via the main chamber spark plug of cylinder 1). Further, coil B is actuated to produce combustion in cylinder 1 by firing the pre-chamber spark plug of cylinder 1 (which also produces a waste spark in cylinder 4 via the main chamber spark plug in cylinder 4) and/or to produce combustion in cylinder 4 by firing the main chamber spark plug of cylinder 4 (which also produces a waste spark in cylinder 1 via the pre-chamber spark plug of cylinder 1).

In some examples, each ignition coil is actuated once during an engine cycle, such as when the engine is operated in the first ignition mode or operated in the second ignition mode. In other examples, such as when the engine is operated in the third ignition mode, each ignition coil is actuated twice during an engine cycle. For example, while operating in the third ignition mode, both ignition coils of a cylinder pair are actuated sequentially or simultaneously at two times during the engine cycle: at a first time during the compression stroke of a first cylinder of the cylinder pair and at a second time during the compression stroke of a second cylinder of the cylinder pair. FIGS. 5A-9B show in more detail the relative ignition coil actuation timings for a variety of firing patterns while operating in the different ignition modes described herein. After 316, method 300 may end.

In this way, an engine system having a multiplexed pre-chamber and main chamber ignition system may be operated in distinct ignition modes based on engine operating conditions, which may increase a performance and a fuel efficiency of the engine. Specifically, adjusting a spark plug firing pattern by selecting an ignition mode based on engine operating conditions may adjust a burn rate in a cylinder of the engine. In some examples, method 300 may run continuously during nominal engine operation in order to continuously provide an ignition source for combustion. An engine with multiplexed ignition coils and a pre-chamber system may operate more efficiently and reliably than an engine having only a pre-chamber system or only cylinder spark plugs. Further, such a system may have reduced cost and complexity than an engine having a separate ignition coils for each pre-chamber and main chamber spark plug.

Figure 4:
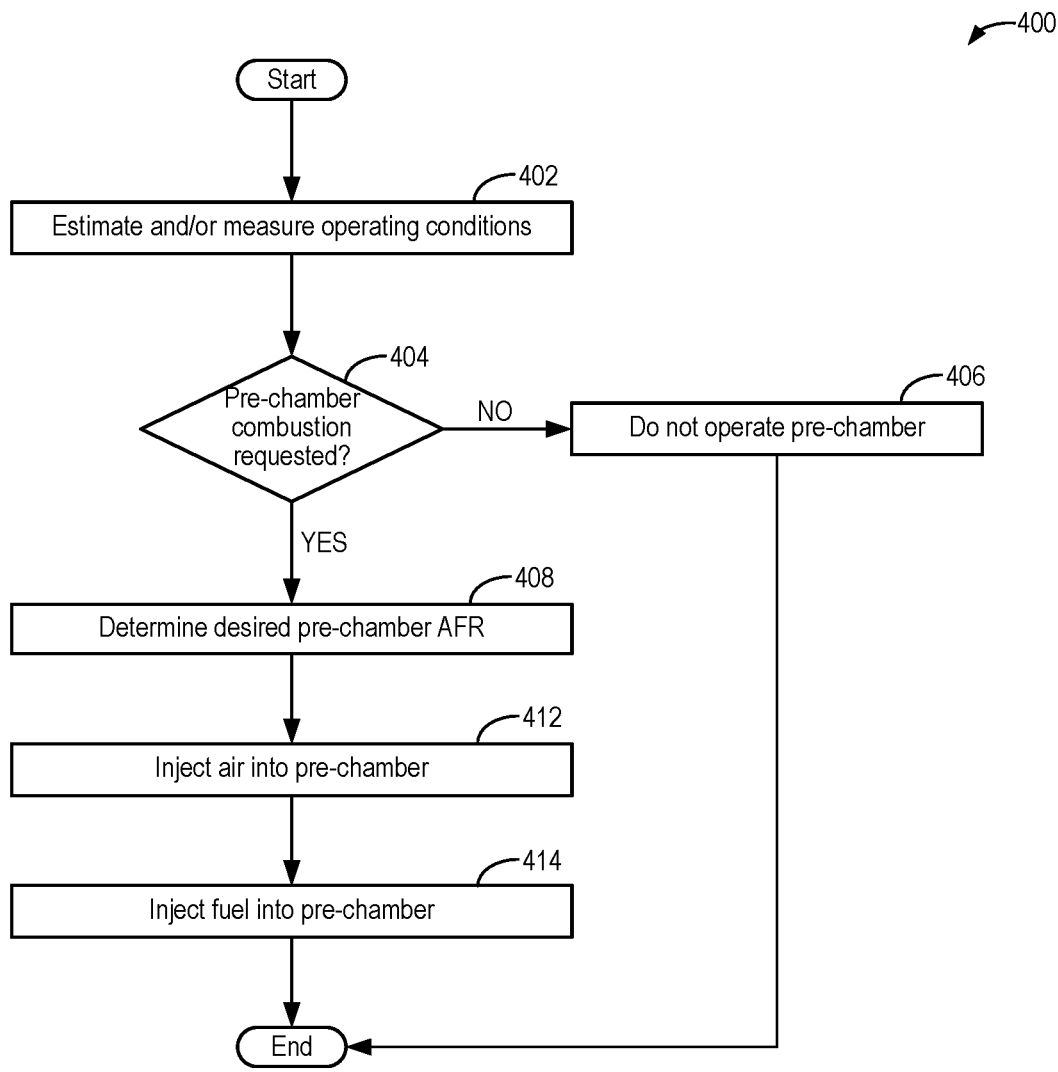
FIG. 4 depicts an example method for operating a pre-chamber of a cylinder.

Next, FIG. 4 shows an example method for operating a pre-chamber of an engine to combust an air-fuel mixture within the pre-chamber. As one example, operating the pre-chamber provides an ignition source for a cylinder of the engine. As another example, operating the pre-chamber additionally or alternatively increases a rate of combustion in the cylinder. Method 400 will be described with respect to engine 10 and the cylinder configuration shown in FIG. 1, although method 400 may be applied in other systems that include active pre-chamber ignition. Further, method 400 will be described for one pre-chamber and cylinder pair, although it may be understood that method 400 may be simultaneously and/or sequentially executed for every cylinder of the engine. In one example, method 400 may be performed by a controller (e.g., controller 12 of FIG. 1) as a part of method 300 of FIG. 3 (e.g., at 314).

At 402, method 400 includes estimating and/or measuring operating conditions. The operating conditions may include, for example, vehicle speed, engine speed, engine load, an engine temperature, an exhaust gas AFR, an accelerator pedal position, a brake pedal position, and a position of a throttle (e.g., throttle position). The operating conditions may be measured by one or more sensors communicatively coupled to the controller or may be inferred based on available data. For example, the accelerator pedal position may be measured by an accelerator pedal position sensor, such as accelerator pedal position sensor 118 of FIG. 1, and the brake pedal position may be measured by a brake pedal position sensor, such as brake pedal position sensor 119 of FIG. 1. Together, the accelerator pedal position and the brake pedal position may indicate a demanded amount of engine torque. As another example, the AFR may be determined based on an oxygen level detected by an exhaust gas oxygen sensor, such as exhaust gas sensor 128 of FIG. 1. Similarly, the throttle position may be measured using a throttle position sensor coupled to the throttle.

At 404, method 400 includes determining whether pre-chamber combustion is requested. For example, the controller may selectively operate the pre-chamber when pre-chamber firing is desired for initiating combustion, such as based on a selected ignition mode (e.g., when the second or third ignition mode is selected but not when the first ignition mode is selected, as defined above with respect to FIG. 3). In some examples, the pre-chamber firing event may be requested during nominal engine operation to provide an ignition source for the cylinder during each combustion cycle. A combustion cycle (e.g., a cylinder cycle) may refer to a four stroke movement of a piston of the cylinder, the four strokes including an intake stroke, a compression stroke, a power stroke, and an exhaust stroke. When the pre-chamber firing event is requested to provide an ignition source for the cylinder during a combustion cycle, the firing event may occur during the end of a compression stroke.

If pre-chamber combustion is not requested at 404, method 400 proceeds to 406, and includes not operating the pre-chamber. In some examples, pre-chamber combustion may not be requested while engine combustion is discontinued. For example, engine combustion may be discontinued while the engine is shut down or during a fuel-cut condition, such as when cylinder fueling is shut off while the vehicle speed decreases. In another example, pre-chamber combustion may not be requested when pre-chamber combustion has already been performed during the combustion cycle. In yet another example, pre-chamber combustion may not be requested when the first ignition mode is selected and only a main chamber spark plug provides ignition to an air-fuel mixture in the cylinder. Not operating the pre-chamber may include not injecting fuel and air into the pre-chamber so that there is no air-fuel mixture for combustion within the pre-chamber. Without an air-fuel mixture to combust, not operating the pre-chamber may further include not activating the spark plug in the pre-chamber to provide an ignition spark, although the pre-chamber spark plug may fire waste sparks that do not initiate combustion. Further, in some examples, not operating the pre-chamber may further include not providing an ignition source to the cylinder. However, in other examples, an alternative ignition source may be provided to the cylinder (e.g., via a cylinder spark plug that is independent from the pre-chamber spark plug or via compression ignition). In one example, the controller may adjust the pulse-widths of actuation signals to the fuel injector and the air injector such that no air-fuel mixture is injected into the pre-chamber. For example, no actuation signal may be sent to each of the fuel injector and the air injector.

If pre-chamber combustion is requested at 404, method 400 proceeds to 408 and includes determining a desired pre-chamber AFR (e.g., a ratio of an amount of air injected to an amount of fuel injected into the pre-chamber). The desired AFR of the pre-chamber may be determined by the controller based on the AFR of the cylinder, such that combustion of an air-fuel mixture in the pre-chamber ignites an air-fuel mixture in the cylinder while minimizing emissions, as an example. For example, the controller may input the AFR of the cylinder and the current engine operating conditions, such as engine speed, exhaust gas temperature, and engine load, into one or more look-up tables, function, and maps, which may output the desired pre-chamber AFR to achieve combustion. As an example, the desired AFR of the pre-chamber may be stoichiometry. As another example, the desired AFR of the pre-chamber may be rich relative to stoichiometry during an engine cold start condition, which may increase combustion stability in the cold start condition, for example. As still another example, the desired AFR of the pre-chamber may be richer than stoichiometry when fuels with higher evaporation temperatures, such as E85, are used in order to account for evaporated fuel that participates in the combustion and non-evaporated fuel that does not participate in combustion to achieve a substantially stoichiometry combustion with the evaporated fuel. As yet another example, the desired AFR of the pre-chamber may be adjusted from stoichiometry when an operating AFR of the cylinder is adjusted from stoichiometry such that when the combustion gases from the cylinder and the pre-chamber are combined, the combined gases have an AFR approximately equal to stoichiometry.

At 412, method 400 includes injecting air into the pre-chamber. In some examples, the air injected may be ambient air from an intake manifold of the engine, while in other examples, the pre-chamber air injector may provide onboard-generated $O_2$ or another combustible gas such as $H_2$. The controller may adjust an amount of air injected into the pre-chamber based on the desired AFR of the pre-chamber, as determined at 308, and the position of the piston in the cylinder. For example, the controller may input the engine operating conditions, including the piston position and the desired AFR of the pre-chamber, into a look-up table, algorithm, or map, which may output a desired air injection amount. As an example, the air injection event may not only provide air for combustion, but may also purge residual gases from a previous pre-chamber firing event from the pre-chamber. In another example, the air injection amount may be held substantially constant while the fuel injection amount is varied to compensate for changes in the desired AFR. For example, an amount of air injected may be approximately equal to a volume in the pre-chamber.

After determining the amount of air to be injected, the controller may inject the desired air amount by adjusting the pulse-width of an actuation signal sent to the pre-chamber air injector. Further, an injection pressure may be above a peak pressure in the cylinder. Because of this, some of the air injected may flow into the cylinder (e.g., due to the pressure in the cylinder being lower than the pressure in the pre-chamber). An amount of air injected to the pre-chamber that flows into the cylinder may be determined based on a pressure difference between the air injector pressure and the pressure in the cylinder and a size of opening(s) in the pre-chamber walls. This value may be used in adjusting cylinder fuel control, for example. However, in other examples, method 400 may not include injecting air into the pre-chamber at 412. For example, the controller may determine that no additional air injection is required to achieve the desired AFR of the pre-chamber. In another example, a pre-chamber ignition system may not include a pre-chamber air injector and may rely on passive air induction to achieve the desired pre-chamber AFR.

At 414, method 400 includes injecting fuel into the pre-chamber. The controller may adjust an amount of fuel injected into the pre-chamber based on the desired AFR of the pre-chamber, as determined at 408, and the amount of air injected (or inducted) at 412. For example, the controller may input the desired pre-chamber AFR into one or more look-up tables, functions, and maps, which may output a desired fuel amount to inject that will achieve the desired AFR in the pre-chamber. In one example, the controller may inject the desired fuel amount by adjusting the pulse-width of an actuation signal sent to the pre-chamber fuel injector, such as FPW2 shown in FIG. 1. The injected fuel may mix with the injected (or inducted) air (e.g., injected at 412) to form an air-fuel mixture. Method 400 may end. For example, the air-fuel mixture in the pre-chamber may be ignited by the pre-chamber spark plug at a timing determined at 310 by actuating an ignition coil coupled to the pre-chamber spark plug at 316 of method 300 of FIG. 3

In this way, the pre-chamber of a cylinder may be operated to ignite a first air-fuel mixture within the pre-chamber, which may further ignite a second air-fuel mixture in the cylinder. In some examples, method 400 may run continuously during nominal engine operation in order to provide a cylinder ignition source when indicated (e.g., when the second or third ignition mode is selected via method 300 of FIG. 3). An engine with active pre-chamber ignition may produce fewer emissions relative to an engine without pre-chamber ignition. For example, jets of flame and hot gas from the pre-chamber may cause the second air-fuel mixture to combust more fully and with a lower peak combustion temperature than a spark plug, which may decrease NOx emissions.

Turning now to FIGS. 5A-9B, different example spark patterns are shown for an engine cycle of an engine including a multiplexed pre-chamber and main chamber ignition system. Specifically, each cylinder of the engine may include a pre-chamber spark plug and a main chamber spark plug, such as described with respect to FIG. 1. For example, the pre-chamber spark plug may be coupled in a pre-chamber located in a clearance volume of the cylinder (e.g., pre-chamber spark plug 92 of FIG. 1), and the main chamber spark plug may be directly coupled to the cylinder (e.g., cylinder spark plug 93 of FIG. 1). Further, each spark pattern is shown for a four-cylinder engine, such as engine 200 schematically shown in FIG. 2, although similar spark patterns may be applied to other systems having a different number of cylinders. A controller (e.g., controller 12 of FIG. 1) may select a desired ignition mode according to method 300 of FIG. 3, for example, and each ignition mode may result in one or more characteristic spark patterns of each spark plug firing relative to cylinder stroke and relative to each other.

Throughout FIGS. 5A-9B, main chamber spark plug firing for a first cylinder is shown in a plot 502, pre-chamber spark plug firing for the first cylinder is shown in a plot 504, main chamber spark plug firing for a second cylinder is shown in a plot 506, pre-chamber spark plug firing for the second cylinder is shown in a plot 508, main chamber spark plug firing for a third cylinder is shown in a plot 510, pre-chamber spark plug firing for the third cylinder is shown in a plot 512, main chamber spark plug firing for a fourth cylinder is shown in a plot 514, pre-chamber spark plug firing for the fourth cylinder is shown in a plot 516, an actuation signal of a coil A is shown in a plot 518, an actuation signal of a coil B is shown in a plot 520, an actuation signal of a coil C is shown in a plot 522, and an actuation signal of a coil D is shown in a plot 524. For all of the above, the horizontal axis represents relative engine position (in crank angle degrees, CAD). Further, the stroke of each cylinder is shown with respect to the relative engine position. The vertical axis represents a firing event of the labeled spark plug for each of plots 502, 504, 506, 508, 510, 512, 514, and 516. The vertical axis represents the actuation signal of the labeled coil for each of plots 518, 520, 522, and 524, with an increase in the actuation signal triggering the firing of the connected spark plugs. As also described above with respect to FIG. 2, a pair of cylinders (e.g., a cylinder pair) share two ignition coils, which together actuate firing of four spark plugs. As indicated by a legend 501, coil A actuates the main chamber spark plug of the first cylinder and the pre-chamber spark plug of the fourth cylinder, and coil B actuates the main chamber spark plug of the fourth cylinder and the pre-chamber spark plug of the first cylinder. Thus, the first cylinder (e.g., cylinder 1) and the fourth cylinder (e.g., cylinder 4) form a cylinder pair. Similarly, coil C actuates the main chamber spark plug of the third cylinder and the pre-chamber spark plug of the second cylinder, and coil D actuates the main chamber spark plug of the second cylinder and the pre-chamber spark plug of the third cylinder. Thus, the second cylinder (e.g., cylinder 2) and the third cylinder (e.g., cylinder 3) form a cylinder pair.

Figure 5A:
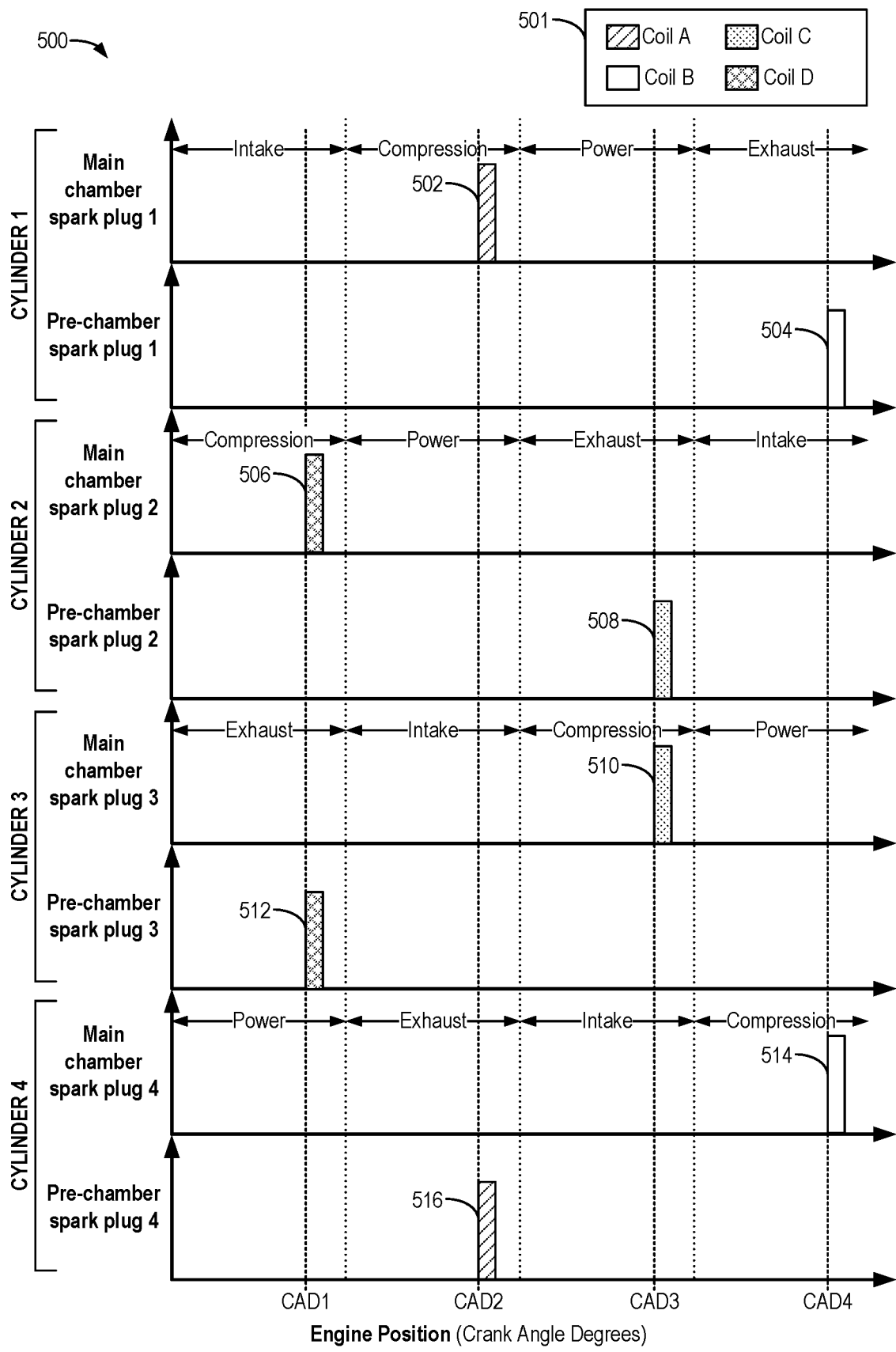
FIGS. 5A-5B show an example spark pattern for operating an engine with a pre-chamber system and multiplexed ignition coils in a first ignition mode.
Figure 5B:
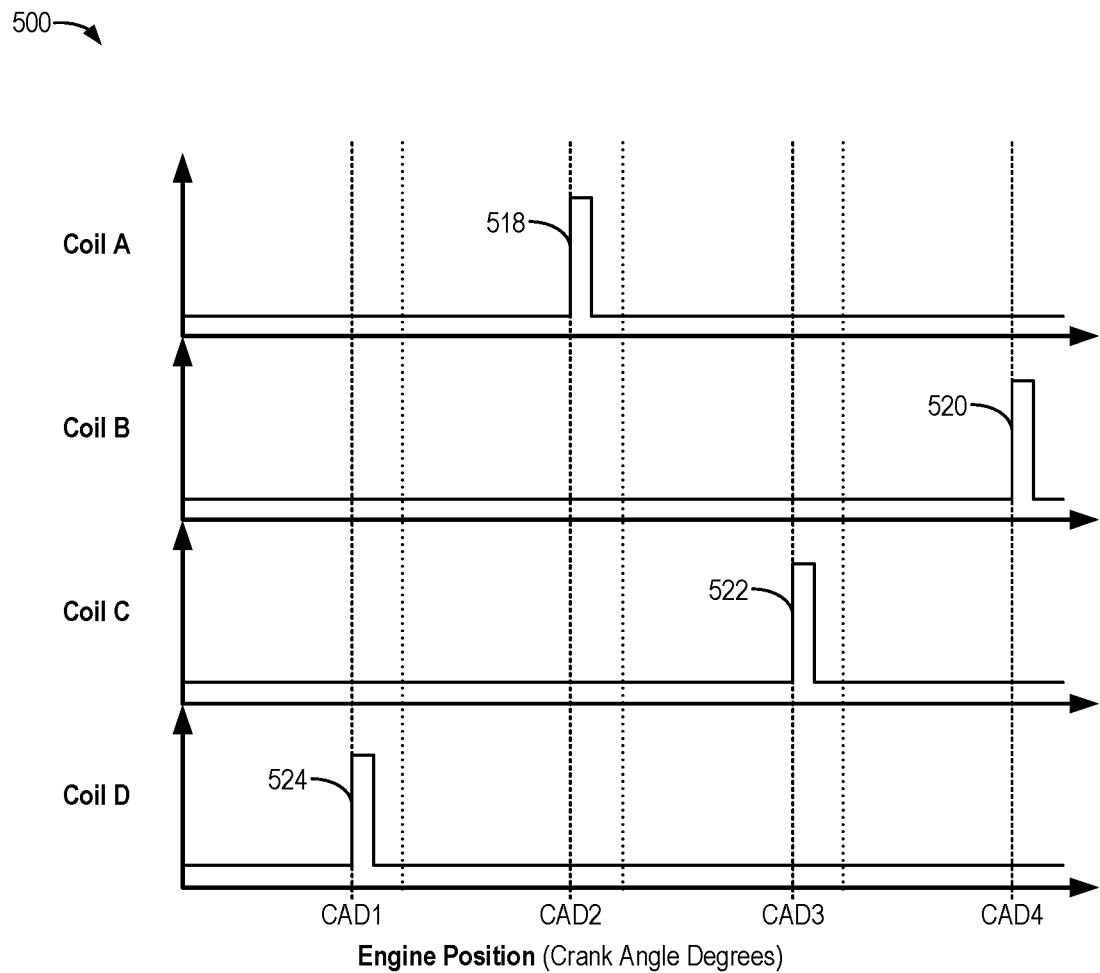

Turning first to FIGS. 5A and 5B, a first example spark pattern 500 is shown. Specifically, FIG. 5A shows the spark plug firing events of first spark pattern 500, and FIG. 5B shows the ignition coil actuation signals of first spark pattern 500. First spark pattern 500 includes operating in a first ignition mode, wherein only the main chamber spark plug of each cylinder is used to initiate combustion and the pre-chamber spark plug of each cylinder produces a waste spark.

At CAD1, cylinder 1 is in its intake stroke, cylinder 2 is in its compression stroke, cylinder 3 is in its exhaust stroke, and cylinder 4 is in its power stroke. Because cylinder 2 is in its compression stroke, ignition is requested for cylinder 2. Therefore, at CAD1, coil D (plot 524) is actuated, causing the main chamber spark plug of cylinder 2 (plot 506) to fire and ignite an air-fuel mixture within cylinder 2. At the same time, the pre-chamber spark plug of cylinder 3 (plot 512) also fires. Because cylinder 3 is unfueled, combustion does not occur in cylinder 3. Instead, the firing of the pre-chamber spark plug of cylinder 3 produces a waste spark. Thus, actuating coil D at CAD1 provides an ignition spark during the compression stroke of cylinder 2 via the main chamber spark plug of cylinder 2 and a waste spark during the exhaust stroke of cylinder 3 via the pre-chamber spark plug of cylinder 3.

At CAD2, cylinder 1 is in its compression stroke, cylinder 2 is in its power stroke, cylinder 3 is in its intake stroke, and cylinder 4 is in its exhaust stroke. Because cylinder 1 is in its compression stroke, ignition is requested for cylinder 1. Therefore, at CAD2, coil A (plot 518) is actuated, causing the main chamber spark plug of cylinder 1 (plot 502) to fire and ignite an air-fuel mixture within cylinder 1. The pre-chamber spark plug of cylinder 4 (plot 516) fires simultaneously with the main chamber spark plug of cylinder 1 at CAD2. Because cylinder 4 is unfueled, combustion does not occur in cylinder 4. Instead, the firing of the pre-chamber spark plug of cylinder 4 produces a waste spark. Thus, actuating coil A at CAD2 provides an ignition spark during the compression stroke of cylinder 1 via the main chamber spark plug of cylinder 1 and a waste spark during the exhaust stroke of cylinder 4 via the pre-chamber spark plug of cylinder 4.

At CAD3, cylinder 1 is in its power stroke, cylinder 2 is in its exhaust stroke, cylinder 3 is in its compression stroke, and cylinder 4 is in its intake stroke. Because cylinder 3 is in its compression stroke, ignition is requested for cylinder 3. Therefore, at CAD3, coil C (plot 522) is actuated, causing the main chamber spark plug of cylinder 3 (plot 510) to fire and ignite an air-fuel mixture within cylinder 3. The pre-chamber spark plug of cylinder 2 (plot 508) also fires at CAD3 because the pre-chamber spark plug of cylinder 2 is also actuated by coil C. Because cylinder 2 is unfueled, combustion does not occur in cylinder 2. Instead, the firing of the pre-chamber spark plug of cylinder 2 produces a waste spark. Thus, actuating coil C at CAD3 provides an ignition spark during the compression stroke of cylinder 3 via the main chamber spark plug of cylinder 3 and a waste spark during the exhaust stroke of cylinder 2 via the pre-chamber spark plug of cylinder 2.

At CAD4, cylinder 1 is in its exhaust stroke, cylinder 2 is in its intake stroke, cylinder 3 is in its power stroke, and cylinder 4 is in its compression stroke. Because cylinder 4 is in its compression stroke, ignition is requested for cylinder 4. Therefore, at CAD4, coil B (plot 520) is actuated, causing the main chamber spark plug of cylinder 4 (plot 514) to fire and ignite an air-fuel mixture within cylinder 4. The pre-chamber spark plug of cylinder 1 (plot 504) fires simultaneously but does not ignite an air-fuel mixture within cylinder 1 because cylinder 1 is unfueled. Instead, the pre-chamber spark plug of cylinder 1 fires an exhaust stroke waste spark. Thus, actuating coil B at CAD4 provides an ignition spark during the compression stroke of cylinder 4 via the main chamber spark plug of cylinder 4 and a waste spark during the exhaust stroke of cylinder 1 via the pre-chamber spark plug of cylinder 1.

Figure 6A:
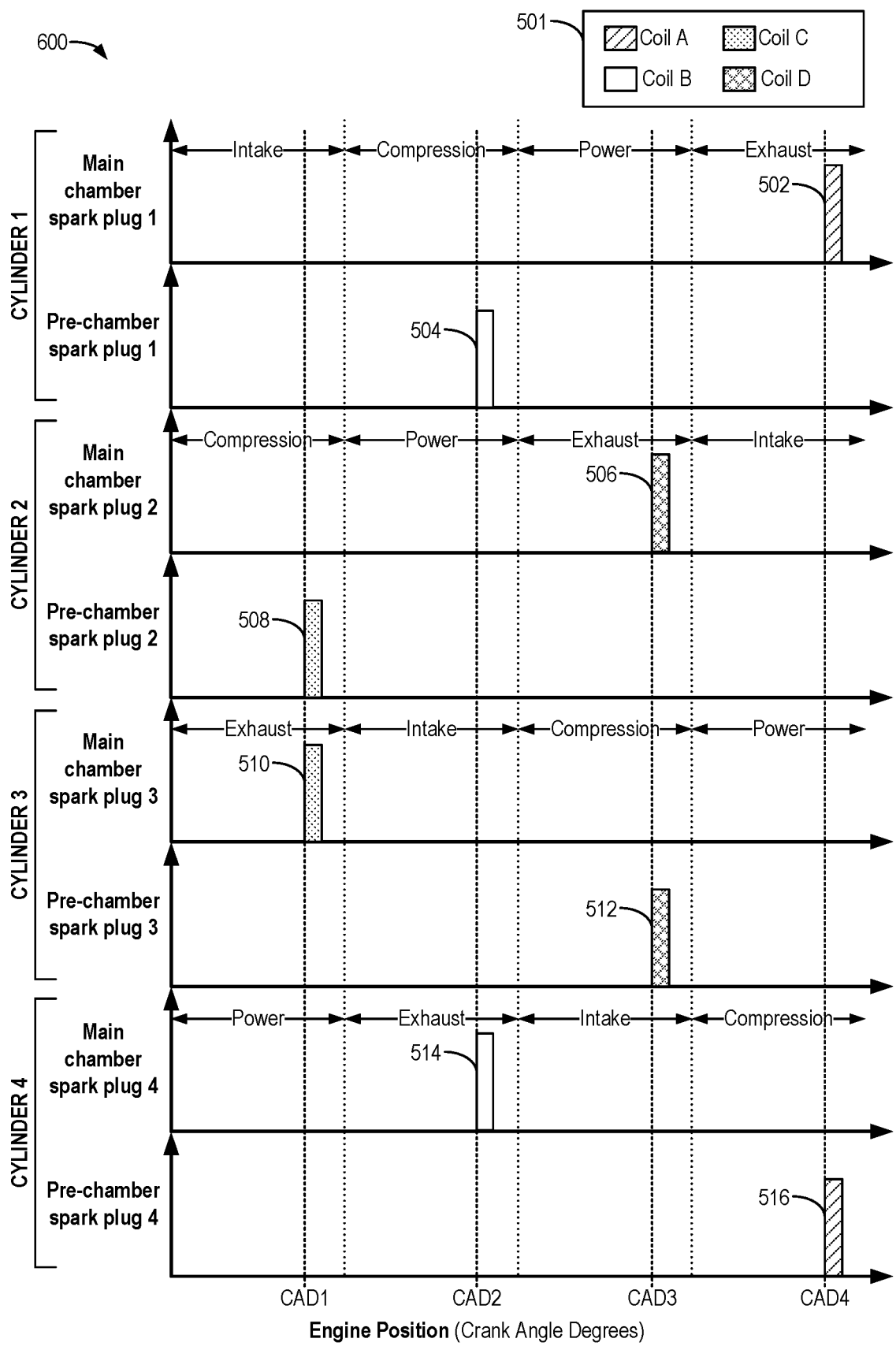
FIGS. 6A-6B show an example spark pattern for operating an engine with a pre-chamber system and multiplexed ignition coils in a second ignition mode.
Figure 6B:
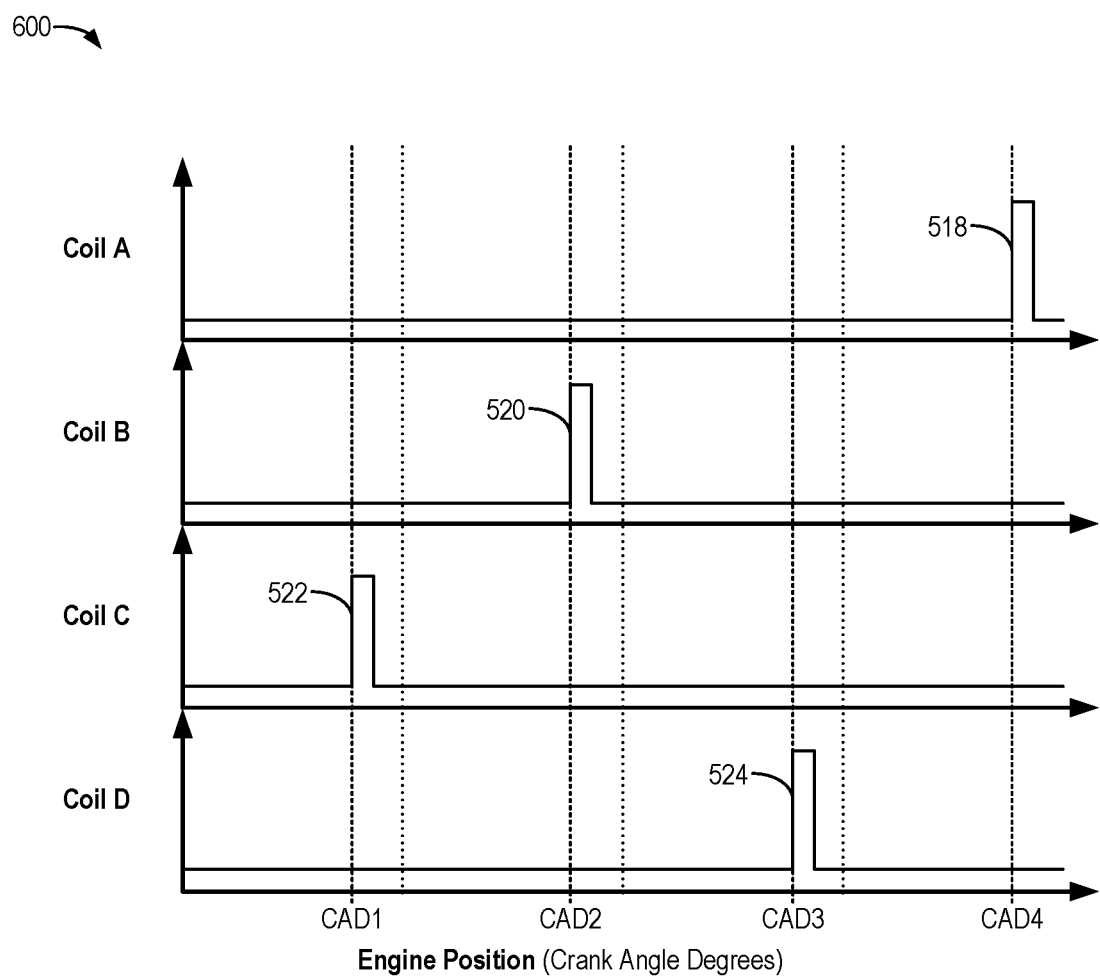

Next, FIGS. 6A and 6B show a second example spark pattern 600. Specifically, FIG. 6A shows the spark plug firing events of second spark pattern 600, and FIG. 6B shows the ignition coil actuation signals of second spark pattern 600. Second spark pattern 600 includes operating in a second ignition mode, wherein only the pre-chamber spark plug of each cylinder is used to initiate combustion and the main chamber spark plug of each cylinder produces a waste spark.

At CAD1, cylinder 1 is in its intake stroke, cylinder 2 is in its compression stroke, cylinder 3 is in its exhaust stroke, and cylinder 4 is in its power stroke. Because cylinder 2 is in its compression stroke, ignition is requested for cylinder 2. Therefore, at CAD1, coil C (plot 522) is actuated, causing the pre-chamber spark plug of cylinder 2 (plot 508) to fire and ignite an air-fuel mixture within cylinder 2. At the same time, the main chamber spark plug of cylinder 3 (plot 510) also fires. Because cylinder 3 is unfueled, combustion does not occur in cylinder 3. Instead, the firing of the main chamber spark plug of cylinder 3 produces a waste spark. Thus, actuating coil C at CAD1 provides an ignition spark during the compression stroke of cylinder 2 via the pre-chamber spark plug of cylinder 2 and a waste spark during the exhaust stroke of cylinder 3 via the main chamber spark plug of cylinder 3.

At CAD2, cylinder 1 is in its compression stroke, cylinder 2 is in its power stroke, cylinder 3 is in its intake stroke, and cylinder 4 is in its exhaust stroke. Because cylinder 1 is in its compression stroke, ignition is requested for cylinder 1. Therefore, at CAD2, coil B (plot 520) is actuated, causing the pre-chamber spark plug of cylinder 1 (plot 504) to fire and ignite an air-fuel mixture within cylinder 1. The main chamber spark plug of cylinder 4 (plot 514) fires simultaneously with the pre-chamber spark plug of cylinder 1 at CAD2. Because cylinder 4 is unfueled, combustion does not occur in cylinder 4. Instead, the firing of the main chamber spark plug of cylinder 4 produces a waste spark. Thus, actuating coil B at CAD2 provides an ignition spark during the compression stroke of cylinder 1 via the pre-chamber spark plug of cylinder 1 and a waste spark during the exhaust stroke of cylinder 4 via the main chamber spark plug of cylinder 4.

At CAD3, cylinder 1 is in its power stroke, cylinder 2 is in its exhaust stroke, cylinder 3 is in its compression stroke, and cylinder 4 is in its intake stroke. Because cylinder 3 is in its compression stroke, ignition is requested for cylinder 3. Therefore, at CAD3, coil D (plot 524) is actuated, causing the pre-chamber spark plug of cylinder 3 (plot 512) to fire and ignite an air-fuel mixture within cylinder 3. The main chamber spark plug of cylinder 2 (plot 506) also fires at CAD3 because the main chamber spark plug of cylinder 2 is also actuated by coil D. Because cylinder 2 is unfueled, combustion does not occur in cylinder 2. Instead, the firing of the main chamber spark plug of cylinder 2 produces a waste spark. Thus, actuating coil D at CAD3 provides an ignition spark during the compression stroke of cylinder 3 via the pre-chamber spark plug of cylinder 3 and a waste spark during the exhaust stroke of cylinder 2 via the main chamber spark plug of cylinder 2.

At CAD4, cylinder 1 is in its exhaust stroke, cylinder 2 is in its intake stroke, cylinder 3 is in its power stroke, and cylinder 4 is in its compression stroke. Because cylinder 4 is in its compression stroke, ignition is requested for cylinder 4. Therefore, at CAD4, coil A (plot 518) is actuated, causing the pre-chamber spark plug of cylinder 4 (plot 516) to fire and ignite an air-fuel mixture within cylinder 4. The main chamber spark plug of cylinder 1 (plot 502) fires simultaneously but does not ignite an air-fuel mixture within cylinder 1 because cylinder 1 is unfueled. Instead, the main chamber spark plug of cylinder 1 fires an exhaust stroke waste spark. Thus, actuating coil A at CAD4 provides an ignition spark during the compression stroke of cylinder 4 via the pre-chamber spark plug of cylinder 4 and a waste spark during the exhaust stroke of cylinder 1 via the main chamber spark plug of cylinder 1.

Figure 7A:
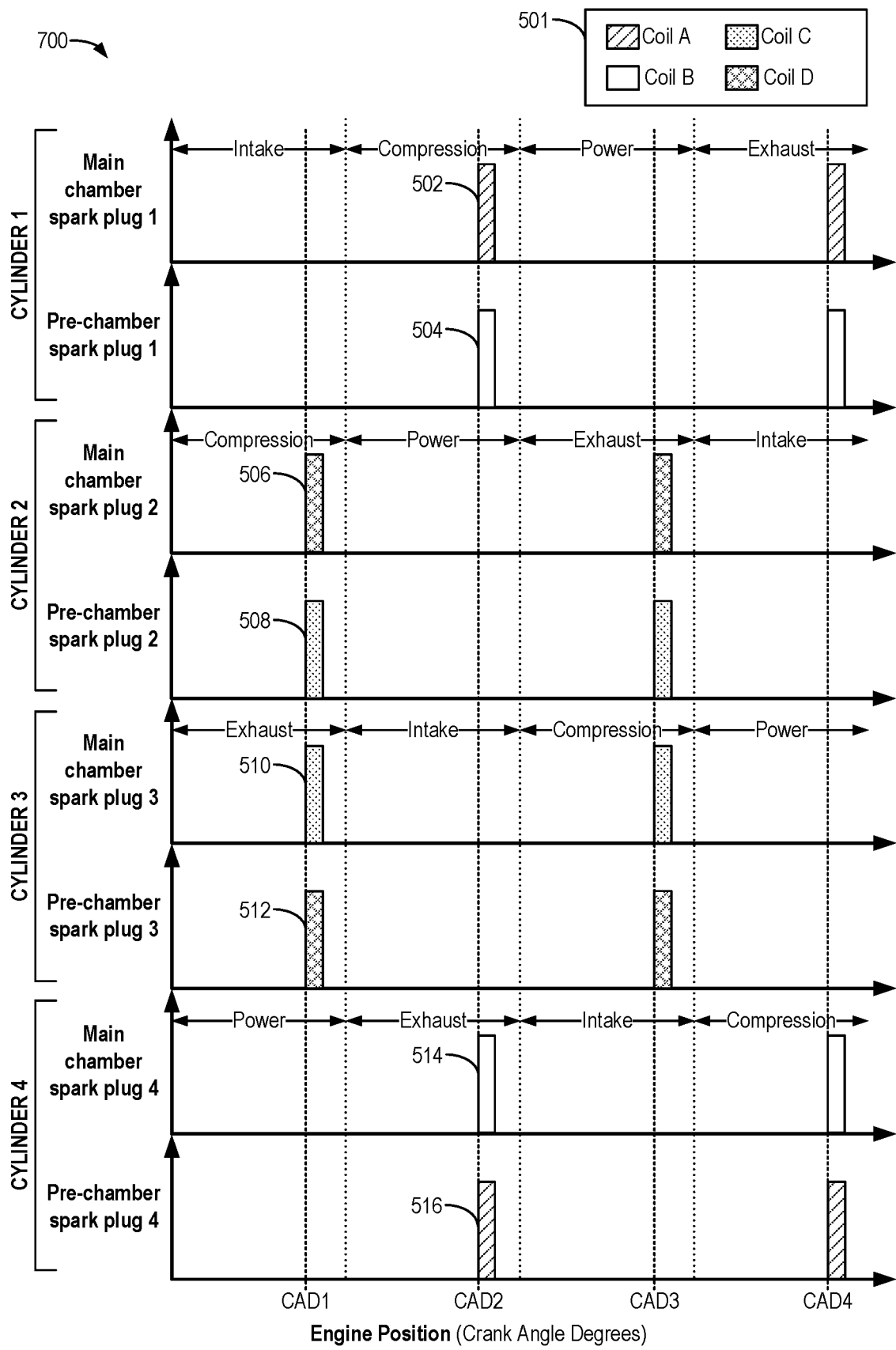
FIGS. 7A-7B show a first example spark pattern for operating an engine with a pre-chamber system and multiplexed ignition coils in a third ignition mode.
Figure 7B:
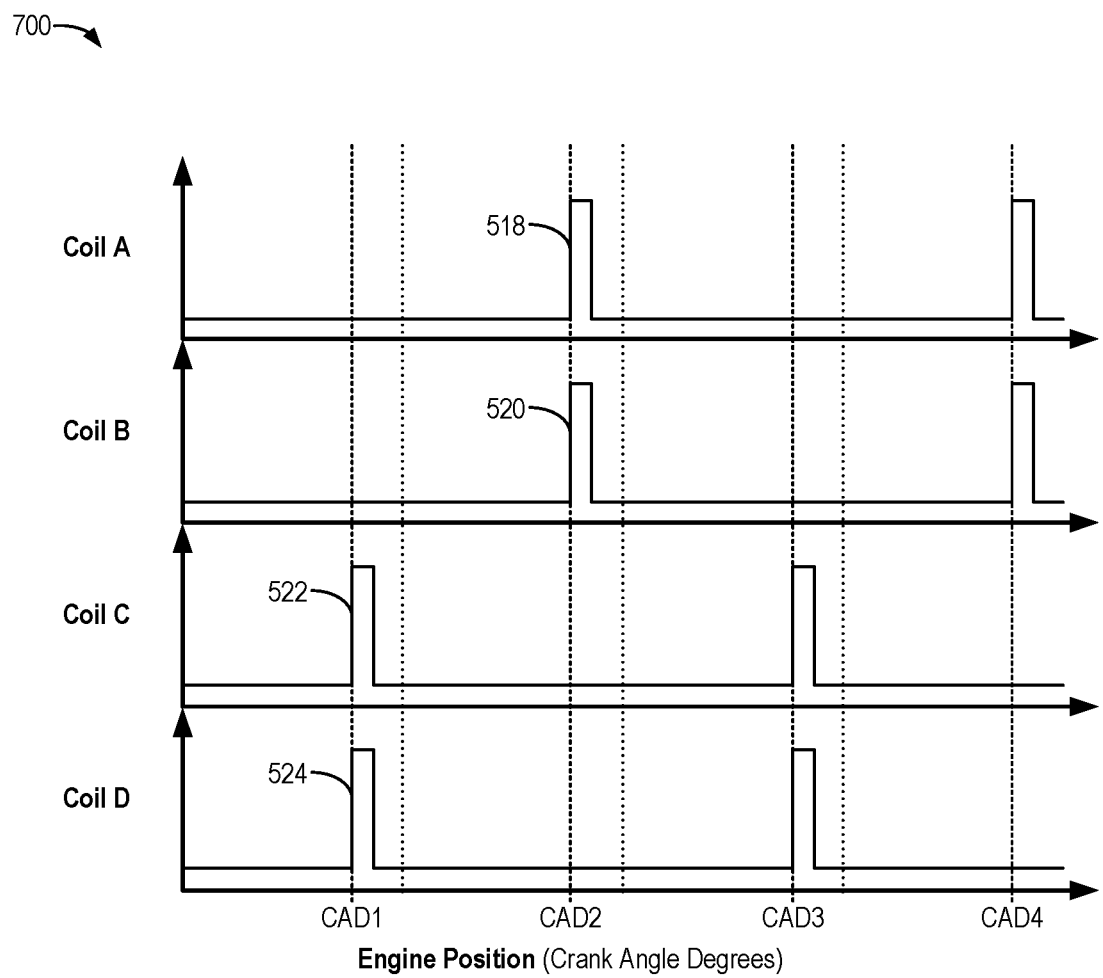

Next, FIGS. 7A and 7B show a third example spark pattern 700. Specifically, FIG. 7A shows the spark plug firing events of third spark pattern 700, and FIG. 7B shows the ignition coil actuation signals of third spark pattern 700. Third spark pattern 700 includes operating in a third ignition mode, wherein both the pre-chamber spark plug and the main chamber spark plug of each cylinder are used to initiate combustion.

At CAD1, cylinder 1 is in its intake stroke, cylinder 2 is in its compression stroke, cylinder 3 is in its exhaust stroke, and cylinder 4 is in its power stroke. Because cylinder 2 is in its compression stroke, ignition is requested for cylinder 2. Therefore, at CAD1, both coil C (plot 522) and coil D (plot 524) are actuated, causing the pre-chamber spark plug of cylinder 2 (plot 508) and the main chamber spark plug of cylinder 2 (plot 506) to fire substantially simultaneously and ignite an air-fuel mixture within cylinder 2. The main chamber spark plug of cylinder 3 (plot 510) and the pre-chamber spark plug of cylinder 3 (plot 512) also simultaneously fire due to the actuation of coil C (plot 522) and coil D (plot 524) at CAD1. Because cylinder 3 is unfueled, combustion does not occur in cylinder 3. Instead, the main chamber spark plug and the pre-chamber spark plug of cylinder 3 each produce a waste spark. Thus, simultaneously actuating coils C and D at CAD1 provides two sparks for ignition in cylinder 2 via both the pre-chamber spark plug and the main chamber spark plug, respectively. Actuating coils C and D at CAD1 also produces two waste sparks in cylinder 3 via the main chamber spark plug of cylinder 3 and the pre-chamber spark plug of cylinder 3, respectively.

At CAD2, cylinder 1 is in its compression stroke, cylinder 2 is in its power stroke, cylinder 3 is in its intake stroke, and cylinder 4 is in its exhaust stroke. Because cylinder 1 is in its compression stroke, ignition is requested for cylinder 1. Therefore, at CAD2, both coil A (plot 518) and coil B (plot 520) are actuated, causing the main chamber spark plug of cylinder 1 (plot 502) and the pre-chamber spark plug of cylinder 1 (plot 504) to simultaneously fire and ignite an air-fuel mixture within cylinder 1. Additionally, the main chamber spark plug of cylinder 4 (plot 514) fires substantially simultaneously with the pre-chamber spark plug of cylinder 1, and the pre-chamber spark plug of cylinder 4 (plot 516) fires substantially simultaneously with the main chamber spark plug of cylinder 1. Because cylinder 4 is unfueled, combustion does not occur in cylinder 4. Instead, the main chamber spark plug and the pre-chamber spark plug of cylinder 4 each produce a waste spark. Thus, simultaneously actuating coils A and B at CAD2 provides two ignition sparks during the compression stroke of cylinder 1 via the main chamber spark plug of cylinder 1 and the pre-chamber spark plug of cylinder 1, respectively. Further, actuating coils A and B at CAD2 produces two exhaust stroke waste sparks in cylinder 4 via the pre-chamber spark plug of cylinder 4 and the main chamber spark plug of cylinder 4, respectively.

At CAD3, cylinder 1 is in its power stroke, cylinder 2 is in its exhaust stroke, cylinder 3 is in its compression stroke, and cylinder 4 is in its intake stroke. Because cylinder 3 is in its compression stroke, ignition is requested for cylinder 3. Therefore, at CAD3, both coil C (plot 522) and coil D (plot 524) are actuated, causing the main chamber spark plug of cylinder 3 (plot 510) and the pre-chamber spark plug of cylinder 3 (plot 512) to simultaneously fire and ignite an air-fuel mixture within cylinder 3. The pre-chamber spark plug of cylinder 2 (plot 508) and the main chamber spark plug of cylinder 2 (plot 506) also fire at CAD3 due to their connections to coils C and D, respectively. Because cylinder 2 is unfueled, combustion does not occur in cylinder 2. Instead, the pre-chamber and main chamber spark plugs of cylinder 2 each produce a waste spark. Thus, simultaneously actuating coils C and D at CAD3 provides two sparks for ignition in cylinder 3 via the main chamber spark plug of cylinder 3 and the pre-chamber spark plug of cylinder 3, respectively. Further, actuating coils C and D at CAD3 produces two waste sparks in cylinder 2 via the pre-chamber spark plug of cylinder 2 and the main chamber spark plug of cylinder 2, respectively.

At CAD4, cylinder 1 is in its exhaust stroke, cylinder 2 is in its intake stroke, cylinder 3 is in its power stroke, and cylinder 4 is in its compression stroke. Because cylinder 4 is in its compression stroke, ignition is requested for cylinder 4. Therefore, at CAD4, both coil A (plot 518) and coil B (plot 520) are actuated, causing the pre-chamber spark plug of cylinder 4 (plot 516) and the main chamber spark plug of cylinder 4 (plot 514) to substantially simultaneously fire and ignite an air-fuel mixture within cylinder 4. The main chamber spark plug of cylinder 1 (plot 502) also fires due to the actuation of coil A and the pre-chamber spark plug of cylinder 1 (plot 504) also fires due to the actuation of coil B, but neither ignites an air-fuel mixture within cylinder 1 because cylinder 1 is unfueled. Instead, the main chamber spark plug of cylinder 1 and the pre-chamber spark plug of cylinder 1 each fires an exhaust stroke waste spark. Thus, simultaneously actuating coils A and B at CAD4 provides two ignition sparks during the compression stroke of cylinder 4 via both the pre-chamber spark plug of cylinder 4 and the main chamber spark plug of cylinder 4, respectively. Furthermore, actuating coils A and B at CAD4 produces two exhaust stroke waste sparks in cylinder 1 via the main chamber spark plug of cylinder 1 and the pre-chamber spark plug of cylinder 1, respectively.

Figure 8A:
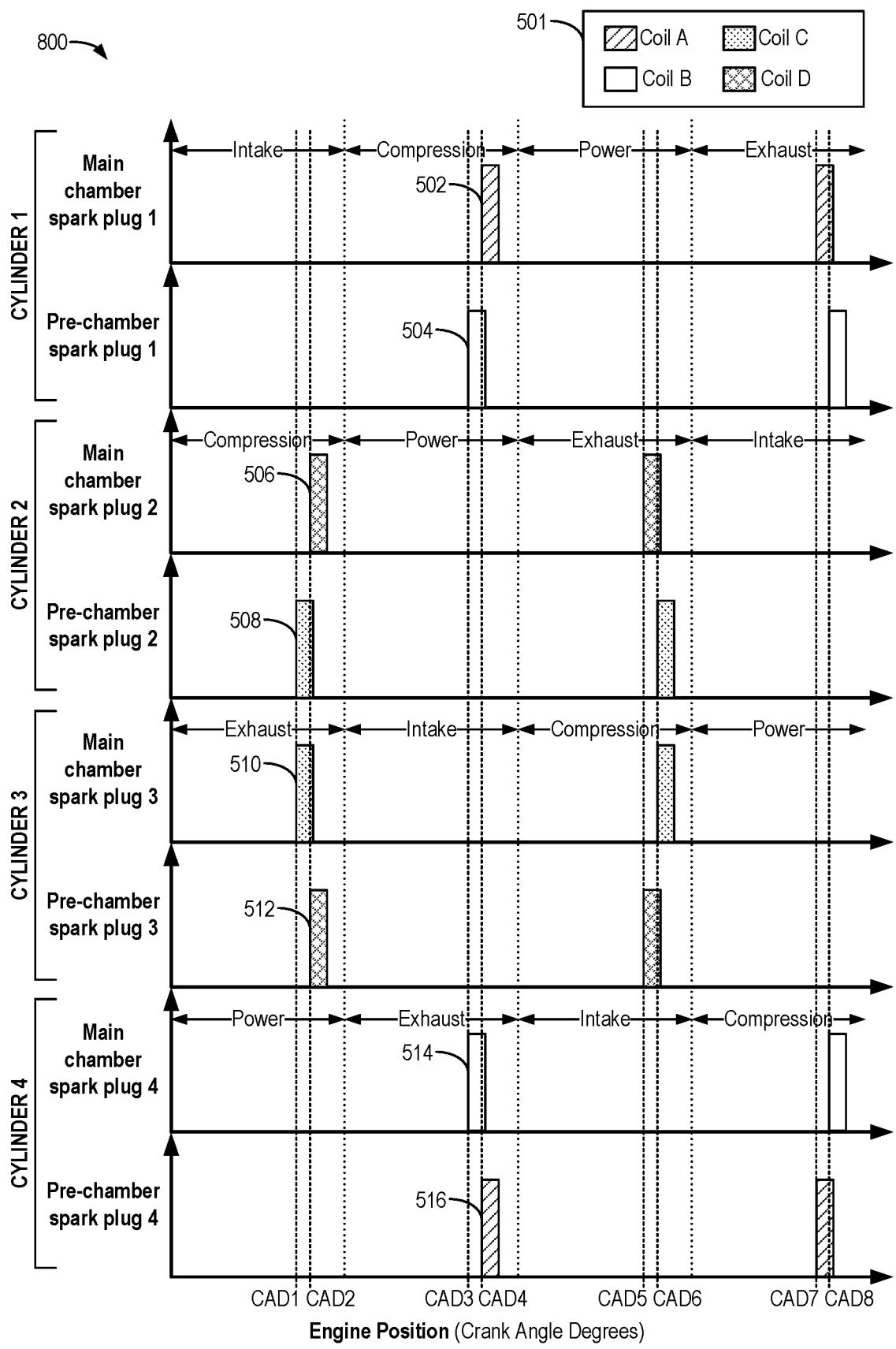
FIGS. 8A-8B show a second example spark pattern for operating an engine with a pre-chamber system and multiplexed ignition coils in the third ignition mode.
Figure 8B:
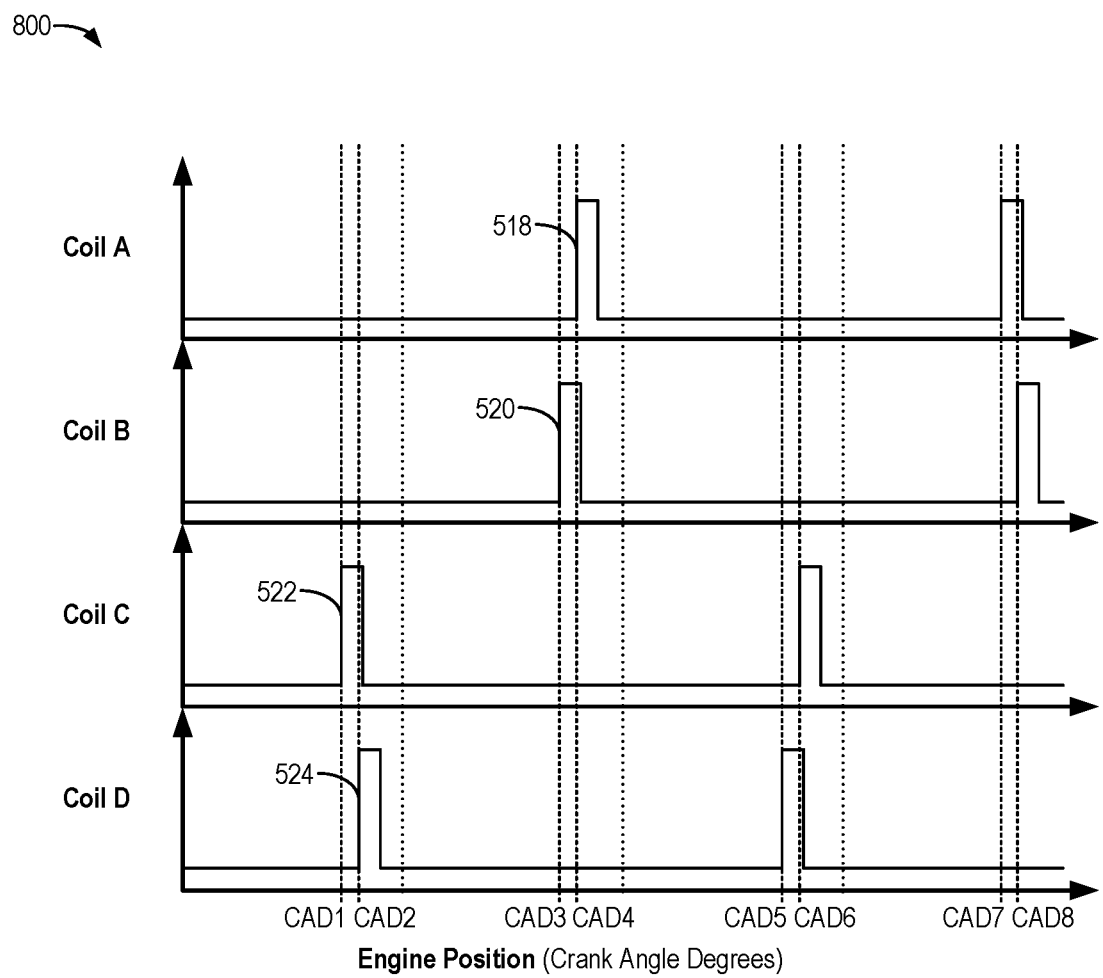

Next, FIGS. 8A and 8B show a fourth example spark pattern 800. Specifically, FIG. 8A shows the spark plug firing events of fourth spark pattern 800, and FIG. 8B shows the ignition coil actuation signals of fourth spark pattern 800. Fourth spark pattern 800 also includes operating in the third ignition mode. However, unlike third spark pattern 700 shown in FIGS. 7A and 7B, the two spark plugs of each cylinder are fired sequentially in fourth spark pattern 800, with a delay between actuating the two ignition coils of a given cylinder. Thus, third spark pattern 700 of FIGS. 7A and 7B shows operation in a first sub-mode of the third ignition mode, while fourth spark pattern 800 of FIGS. 8A and 8B shows operation in a second sub-mode of the third ignition mode.

At CAD1, cylinder 1 is in its intake stroke, cylinder 2 is in its compression stroke, cylinder 3 is in its exhaust stroke, and cylinder 4 is in its power stroke. Because cylinder 2 is in its compression stroke, ignition is requested for cylinder 2. Therefore, at CAD1, coil C (plot 522) is actuated, causing the pre-chamber spark plug of cylinder 2 (plot 508) to fire and ignite an air-fuel mixture within cylinder 2. At the same time, the main chamber spark plug of cylinder 3 (plot 510) also fires. Because cylinder 3 is unfueled, combustion does not occur in cylinder 3. Thus, actuating coil C at CAD1 produces a first compression stroke ignition spark via the pre-chamber spark plug of cylinder 2 and a first exhaust stroke waste spark via the main chamber spark plug of cylinder 3.

At CAD2, which may occur a relatively short time after CAD1 and while each cylinder remains in the same stroke as at CAD1, coil D (plot 524) is actuated, causing the main chamber spark plug of cylinder 2 (plot 506) and the pre-chamber spark plug of cylinder 3 (plot 512) to fire. Thus, at CAD2, the main chamber spark plug of cylinder 2 provides a second compression stroke ignition spark to cylinder 2 while the pre-chamber spark plug of cylinder 3 provides a second exhaust stroke waste spark to cylinder 3. By actuating coil C before coil D, the pre-chamber spark plug of cylinder 2 fires before the main chamber spark plug of cylinder 2 to produce sequential, staggered ignition sparks.

At CAD3, cylinder 1 is in its compression stroke, cylinder 2 is in its power stroke, cylinder 3 is in its intake stroke, and cylinder 4 is in its exhaust stroke. Because cylinder 1 is in its compression stroke, ignition is requested for cylinder 1. Therefore, coil B (plot 520) is actuated at CAD3, causing the pre-chamber spark plug of cylinder 1 (plot 504) to fire and ignite an air-fuel mixture within cylinder 1. At the same time, the main chamber spark plug of cylinder 4 (plot 514) fires during the (unfueled) exhaust stroke of cylinder 4, producing a waste spark that does not initiate combustion in cylinder 4. Thus, actuating coil B at CAD3 produces a first compression stroke ignition spark via the pre-chamber spark plug of cylinder 1 and produces a first exhaust stroke waste spark via the main chamber spark plug of cylinder 4.

At CAD4, which may occur a relatively short time after CAD3 and while each cylinder remains in the same stroke as at CAD3, coil A (plot 518) is actuated, causing the main chamber spark plug of cylinder 1 (plot 502) and the pre-chamber spark plug of cylinder 4 (plot 516) to fire. Thus, at CAD4, the main chamber spark plug of cylinder 1 provides a second compression stroke ignition spark to cylinder 1 while the pre-chamber spark plug of cylinder 4 provides a second exhaust stroke waste spark to cylinder 4. By actuating coil B before coil A, the pre-chamber spark plug of cylinder 1 fires before the main chamber spark plug of cylinder 1 to produce sequential, staggered ignition sparks.

At CAD5, cylinder 1 is in its power stroke, cylinder 2 is in its exhaust stroke, cylinder 3 is in its compression stroke, and cylinder 4 is in its intake stroke. Because cylinder 3 is in its compression stroke, ignition is requested for cylinder 3. Therefore, at CAD5, coil D (plot 524) is actuated, causing the pre-chamber spark plug of cylinder 3 (plot 512) to fire and ignite an air-fuel mixture within cylinder 3. The main chamber spark plug of cylinder 2 (plot 506) also fires at CAD5 because the main chamber spark plug of cylinder 2 is also actuated by coil D. Because cylinder 2 is unfueled, combustion does not occur in cylinder 2. Thus, actuating coil D at CAD5 produces a first compression stroke ignition spark in cylinder 3 via the pre-chamber spark plug of cylinder 3 and produces a first exhaust stroke waste spark in cylinder 2 via the main chamber spark plug of cylinder 2.

At CAD6, which may occur a short time after CAD5 and while each cylinder remains in the same stroke, coil C (plot 522) is actuated, causing the main chamber spark plug of cylinder 3 (plot 510) to fire during the compression stroke of cylinder 3 and the pre-chamber spark plug of cylinder 2 (plot 508) to fire during the exhaust stroke of cylinder 2. Thus, at CAD6, the main chamber spark plug of cylinder 3 provides a second compression stroke ignition spark to cylinder 3 while the pre-chamber spark plug of cylinder 2 provides a second exhaust stroke waste spark to cylinder 2. By actuating coil D before coil C, the pre-chamber spark plug of cylinder 3 fires before the main chamber spark plug of cylinder 3 to produce sequential, staggered ignition sparks.

At CAD7, cylinder 1 is in its exhaust stroke, cylinder 2 is in its intake stroke, cylinder 3 is in its power stroke, and cylinder 4 is in its compression stroke. Because cylinder 4 is in its compression stroke, ignition is requested for cylinder 4. Therefore, at CAD7, coil A (plot 518) is actuated, causing the pre-chamber spark plug of cylinder 4 (plot 516) to fire and ignite an air-fuel mixture within cylinder 4. Substantially simultaneously, the main chamber spark plug of cylinder 1 (plot 502) fires, producing a waste spark in cylinder 1 that does not initiate combustion. Thus, actuating coil A at CAD7 produces a first compression stroke ignition spark via the pre-chamber spark plug of cylinder 4 and produces a first exhaust stroke waste spark via the main chamber spark plug of cylinder 1.

At CAD8, which occurs while the cylinders remain in the same strokes as at CAD7, coil B (plot 520) is actuated, causing the main chamber spark plug of cylinder 4 (plot 514) to fire during the compression stroke of cylinder 4 and the pre-chamber spark plug of cylinder 1 (plot 504) to fire during the exhaust stroke of cylinder 1. Thus, at CAD8, the main chamber spark plug of cylinder 4 provides a second compression stroke ignition spark to cylinder 4 while the pre-chamber spark plug of cylinder 1 provides a second exhaust stroke waste spark to cylinder 1. By actuating coil A before coil B, the pre-chamber spark plug of cylinder 4 fires before the main chamber spark plug of cylinder 4 to produce sequential, staggered ignition sparks.

Figure 9A:
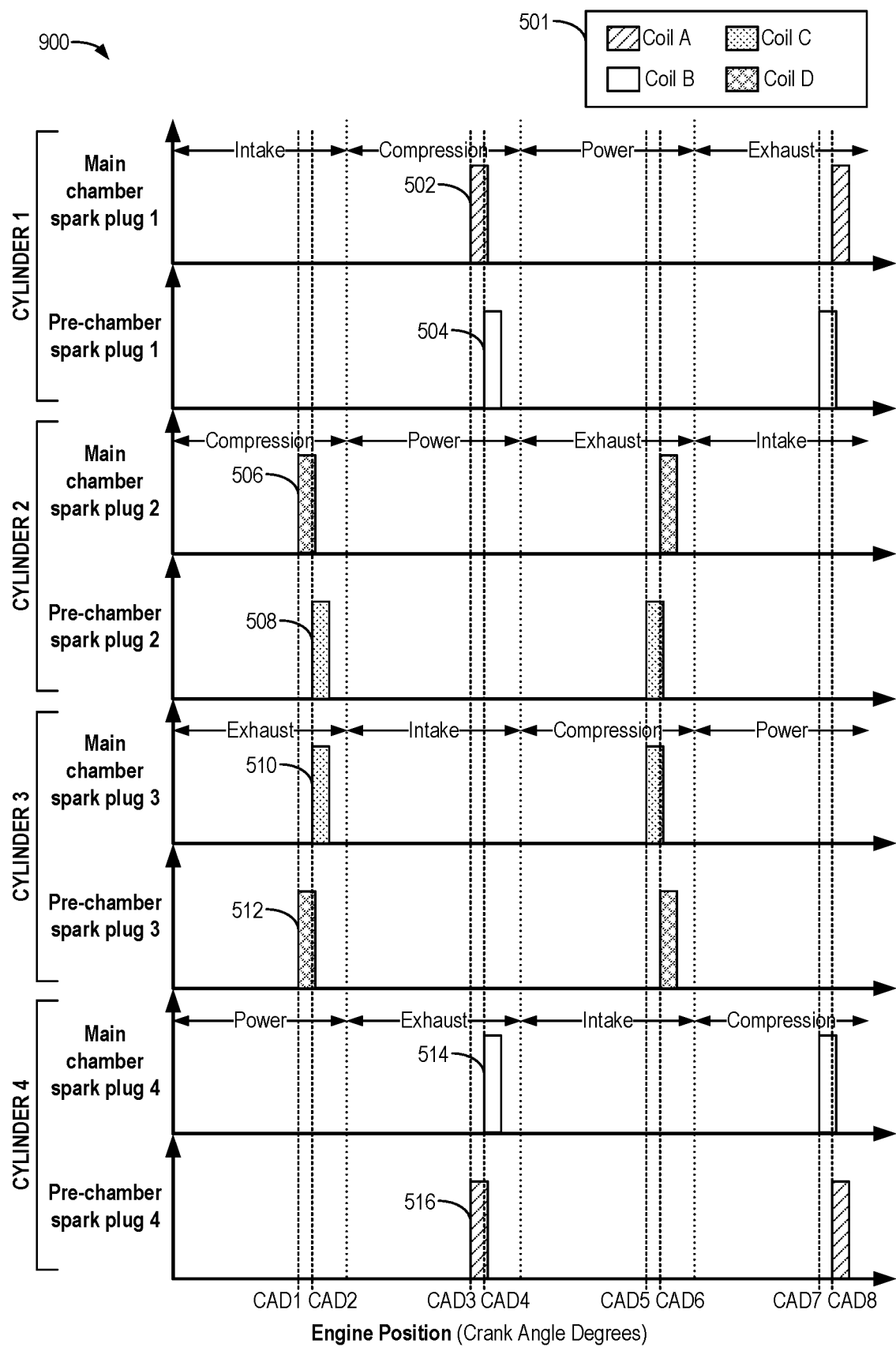
FIGS. 9A-9B show a third example spark pattern for operating an engine with a pre-chamber system and multiplexed ignition coils in the third ignition mode.
Figure 9B:
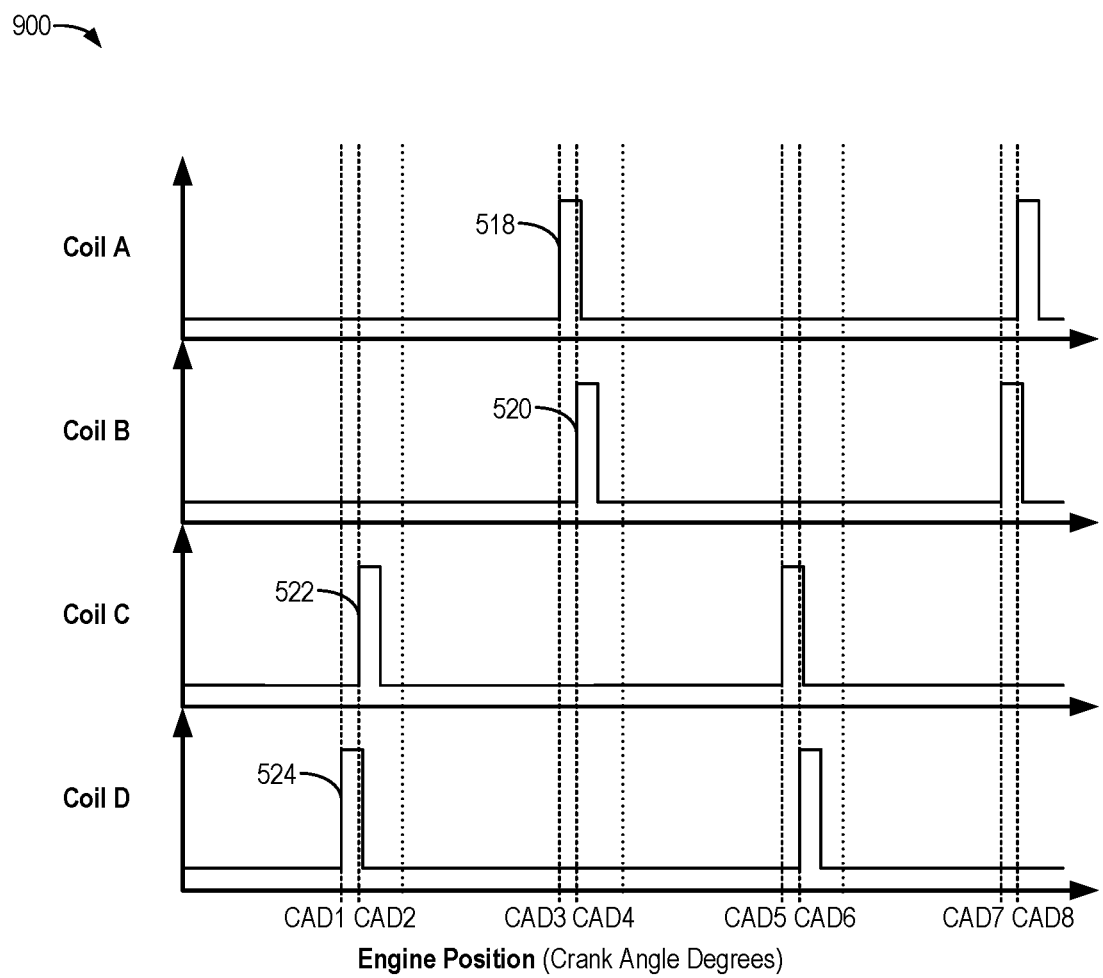
Figure 10:
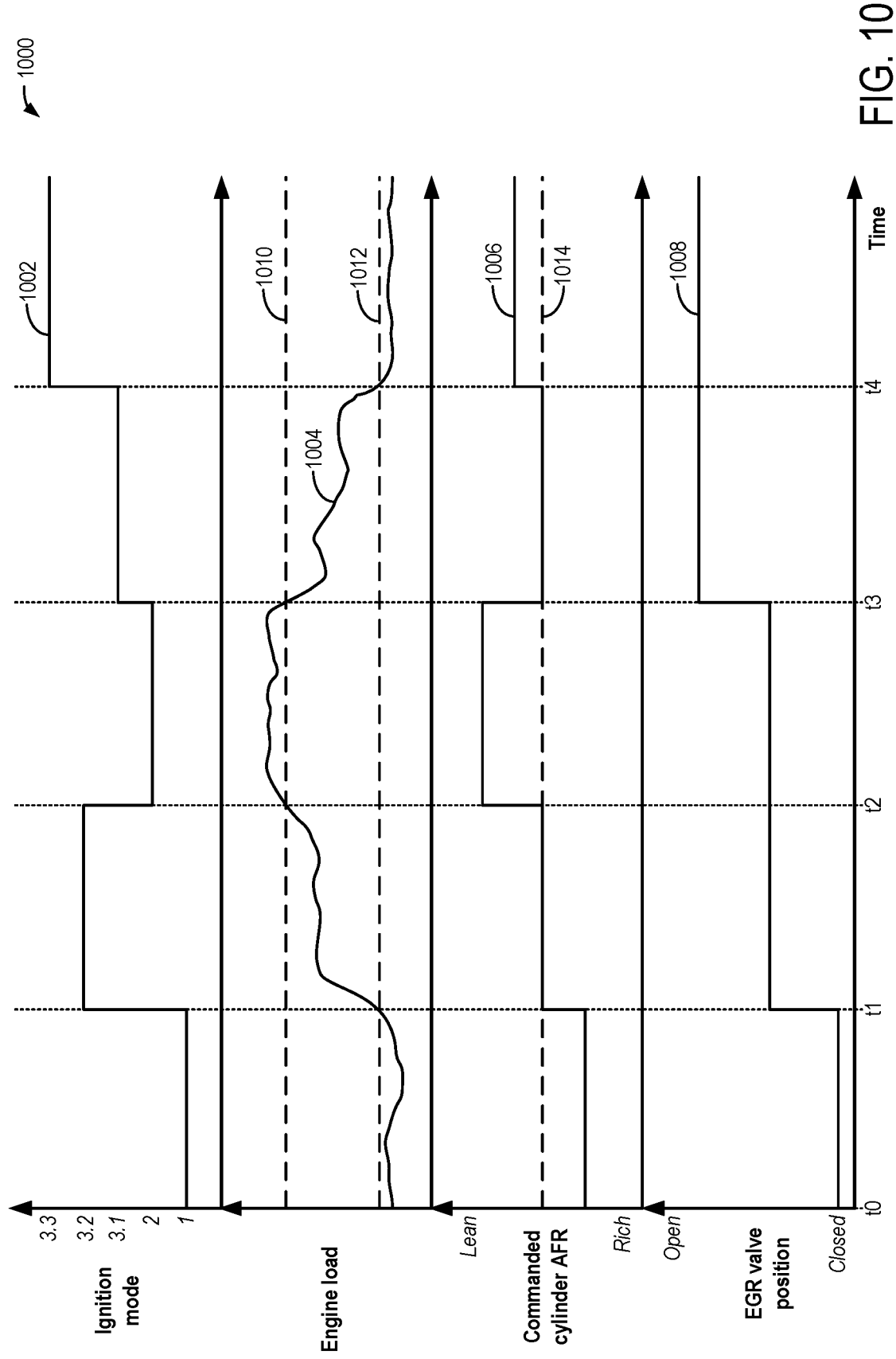
FIG. 10 shows a prophetic example timeline of operating an engine having a multiplexed pre-chamber and main chamber ignition system in different ignition modes selected according to engine operating conditions.

Next, FIGS. 9A and 9B show a fifth example spark pattern 900. Specifically, FIG. 9A shows the spark plug firing events of fifth spark pattern 900, and FIG. 9B shows the ignition coil actuation signals of fifth spark pattern 900. Fifth spark pattern 900 includes again includes operating in the third ignition mode. Similar to fourth spark pattern 800 shown in FIGS. 8A and 8B, the two spark plugs of each cylinder are fired sequentially, with a delay between actuating the two ignition coils of a given cylinder. However, the actuation order of the pre-chamber spark plug and the main chamber spark plug in fifth spark pattern 900 is opposite that of fourth spark pattern 800 of FIGS. 8A and 8B. Thus, fifth spark pattern 900 shows operation in a third sub-mode of the third ignition mode.

At CAD1, cylinder 1 is in its intake stroke, cylinder 2 is in its compression stroke, cylinder 3 is in its exhaust stroke, and cylinder 4 is in its power stroke. Because cylinder 2 is in its compression stroke, ignition is requested for cylinder 2. Therefore, at CAD1, coil D (plot 524) is actuated, causing the main chamber spark plug of cylinder 2 (plot 506) to fire and ignite an air-fuel mixture within cylinder 2. At the same time, the pre-chamber spark plug of cylinder 3 (plot 512) also fires. Because cylinder 3 is unfueled, combustion does not occur in cylinder 3. Thus, actuating coil D at CAD1 produces a first compression stroke ignition spark via the main chamber spark plug of cylinder 2 and a first exhaust stroke waste spark via the pre-chamber spark plug of cylinder 3.

At CAD2, which may occur a relatively short time after CAD1 and while each cylinder remains in the same stroke as at CAD1, coil C (plot 522) is actuated, causing the pre-chamber spark plug of cylinder 2 (plot 508) and the main chamber spark plug of cylinder 3 (plot 510) to fire. Thus, at CAD2, the pre-chamber spark plug of cylinder 2 provides a second compression stroke ignition spark to cylinder 2 while the main chamber spark plug of cylinder 3 provides a second exhaust stroke waste spark to cylinder 3. By actuating coil D before coil C, the main chamber spark plug of cylinder 2 fires before the pre-chamber spark plug of cylinder 2 to produce sequential, staggered ignition sparks.

At CAD3, cylinder 1 is in its compression stroke, cylinder 2 is in its power stroke, cylinder 3 is in its intake stroke, and cylinder 4 is in its exhaust stroke. Because cylinder 1 is in its compression stroke, ignition is requested for cylinder 1. Therefore, coil A (plot 518) is actuated at CAD3, causing the main chamber spark plug of cylinder 1 (plot 502) to fire and ignite an air-fuel mixture within cylinder 1. At the same time, the pre-chamber spark plug of cylinder 4 (plot 516) fires during the (unfueled) exhaust stroke of cylinder 4, producing a waste spark that does not initiate combustion in cylinder 4. Thus, actuating coil A at CAD3 produces a first compression stroke ignition spark via the main chamber spark plug of cylinder 1 and produces a first exhaust stroke waste spark via the pre-chamber spark plug of cylinder 4.

At CAD4, which may occur a relatively short time after CAD3 and while each cylinder remains in the same stroke as at CAD3, coil B (plot 520) is actuated, causing the pre-chamber spark plug of cylinder 1 (plot 504) and the main chamber spark plug of cylinder 4 (plot 514) to fire. Thus, at CAD4, the pre-chamber spark plug of cylinder 1 provides a second compression stroke ignition spark to cylinder 1 while the main chamber spark plug of cylinder 4 provides a second exhaust stroke waste spark to cylinder 4. By actuating coil A before coil B, the main chamber spark plug of cylinder 1 fires before the pre-chamber spark plug of cylinder 1 to produce sequential, staggered ignition sparks.

At CAD5, cylinder 1 is in its power stroke, cylinder 2 is in its exhaust stroke, cylinder 3 is in its compression stroke, and cylinder 4 is in its intake stroke. Because cylinder 3 is in its compression stroke, ignition is requested for cylinder 3. Therefore, at CAD5, coil C (plot 522) is actuated, causing the main chamber spark plug of cylinder 3 (plot 510) to fire and ignite an air-fuel mixture within cylinder 3. The pre-chamber spark plug of cylinder 2 (plot 508) also fires at CAD5 because the pre-chamber spark plug of cylinder 2 is also actuated by coil C. Because cylinder 2 is unfueled, combustion does not occur in cylinder 2. Thus, actuating coil C at CAD5 produces a first compression stroke ignition spark in cylinder 3 via the main chamber spark plug of cylinder 3 and produces a first exhaust stroke waste spark in cylinder 2 via the pre-chamber spark plug of cylinder 2.

At CAD6, which may occur a short time after CAD5 and while each cylinder remains in the same stroke, coil D (plot 524) is actuated, causing the pre-chamber spark plug of cylinder 3 (plot 512) to fire during the compression stroke of cylinder 3 and the main chamber spark plug of cylinder 2 (plot 506) to fire during the exhaust stroke of cylinder 2. Thus, at CAD6, the pre-chamber spark plug of cylinder 3 provides a second compression stroke ignition spark to cylinder 3 while the main chamber spark plug of cylinder 2 provides a second exhaust stroke waste spark to cylinder 2. By actuating coil C before coil D, the main chamber spark plug of cylinder 3 fires before the pre-chamber spark plug of cylinder 3 to produce sequential, staggered ignition sparks.

At CAD7, cylinder 1 is in its exhaust stroke, cylinder 2 is in its intake stroke, cylinder 3 is in its power stroke, and cylinder 4 is in its compression stroke. Because cylinder 4 is in its compression stroke, ignition is requested for cylinder 4. Therefore, at CAD7, coil B (plot 520) is actuated, causing the main chamber spark plug of cylinder 4 (plot 514) to fire and ignite an air-fuel mixture within cylinder 4. Substantially simultaneously, the pre-chamber spark plug of cylinder 1 (plot 504) fires, producing a waste spark in cylinder 1 that does not initiate combustion. Thus, actuating coil B at CAD7 produces a first compression stroke ignition spark via the main chamber spark plug of cylinder 4 and produces a first exhaust stroke waste spark via the pre-chamber spark plug of cylinder 1.

At CAD8, which occurs while the cylinders remain in the same strokes as at CAD7, coil A (plot 518) is actuated, causing the pre-chamber spark plug of cylinder 4 (plot 516) to fire during the compression stroke of cylinder 4 and the main chamber spark plug of cylinder 1 (plot 502) to fire during the exhaust stroke of cylinder 1. Thus, at CAD8, the pre-chamber spark plug of cylinder 4 provides a second compression stroke ignition spark to cylinder 4 while the main chamber spark plug of cylinder 1 provides a second exhaust stroke waste spark to cylinder 1. By actuating coil B before coil A, the main chamber spark plug of cylinder 4 fires before the pre-chamber spark plug of cylinder 4 to produce sequential, staggered ignition sparks.

In this way, FIGS. 5A-9B provide five example spark patterns that may result from selecting different ignition modes based on engine operating conditions in order to achieve desired combustion characteristics. In particular, first spark pattern 500 of FIGS. 5A and 5B and second spark pattern 600 of FIGS. 6A and 6B include one ignition spark and one waste spark per cylinder per engine cycle. Further, the main chamber spark plug provides the ignition spark (and the pre-chamber spark plug provides the waste spark) to each cylinder in first spark pattern 500, which results from operating in the first ignition mode, while the pre-chamber spark plug provides the ignition spark (and the main chamber spark plug provides the waste spark) to each cylinder in second spark pattern 600, which results from operating in the second ignition mode. Third spark pattern 700 of FIGS. 7A and 7B, fourth spark pattern 800 of FIGS. 8A and 8B, and fifth spark pattern 900 of FIGS. 9A and 9B each include two ignition sparks and two waste sparks per cylinder per engine cycle, which result from operating in the third ignition mode. Specifically, third spark pattern 700 includes simultaneously actuating pre-chamber and main chamber ignition sparks, while the pre-chamber and main chamber ignition sparks are not sequential in fourth spark pattern 800 and fifth spark pattern 900. Further still, the pre-chamber ignition spark is provided before the main chamber spark in the fourth spark pattern 800, while the main chamber ignition spark is provided before the pre-chamber ignition spark in the fifth spark pattern 900. Thus, third spark pattern 700, fourth spark pattern 800, and fifth spark pattern 900 illustrate spark patterns resulting from variations (or sub-modes) within the third ignition mode.

Turning now to FIG. 10, a prophetic example timeline 1000 for selecting an ignition mode of an engine with a multiplexed pre-chamber and main chamber ignition system based on engine operating conditions is shown. The engine may be engine 10 of FIG. 1, for example, and may include a controller (e.g., controller 12). As shown in FIG. 1, each cylinder of the engine includes a pre-chamber (e.g., pre-chamber 138), including a pre-chamber spark plug (e.g., pre-chamber spark plug 92) and a main chamber spark plug (e.g., main chamber spark plug 93), and the spark signal used to actuate each spark plug is multiplexed via a shared ignition coil. That is, each pre-chamber spark plug shares spark signal with a main chamber spark plug of another cylinder. For example, the multiplexed pre-chamber and main chamber ignition system may be multiplexed pre-chamber and main chamber ignition system 205 of FIG. 2. A selected ignition mode is shown in plot 1002, an engine load is shown in plot 1004, a commanded cylinder AFR is shown in plot 1006, and an EGR valve position is shown in plot 1008. Further, a first, higher threshold engine load is shown by dashed line 1010, a second, lower threshold engine load is shown by dashed line 1012, and stoichiometry is shown by dashed line 1014. A commanded cylinder AFR less than stoichiometry is rich (e.g., more fuel than air is provided than for producing a complete combustion reaction), while a commanded cylinder AFR greater than stoichiometry is lean (e.g., more air than fuel is provided for producing a complete combustion reaction).

For all of the above, the horizontal axis represents time, with time increasing along the horizontal axis from left to right. The vertical axis represents each labeled parameter. For each of the plots 1004 and 1006, a magnitude of the parameter increases up the vertical axis. For plot 1002, the vertical axis shows whether the engine is operating in a first ignition mode ("1"), a second ignition mode ("2"), a first sub-mode of a third ignition mode ("3.1"), a second sub-mode of the third ignition mode ("3.2"), or a third sub-mode of the third ignition mode ("3.3"). As described above with respect to FIG. 3, the first ignition mode includes providing an ignition spark via only the main chamber spark plug, and the second ignition mode includes providing an ignition spark via only the pre-chamber spark plug. The first sub-mode of the third ignition mode includes providing simultaneous ignition sparks via both the main chamber spark plug and the pre-chamber spark plug. The second sub-mode of the third ignition mode includes providing a first, earlier ignition spark via the pre-chamber spark plug and a second, later ignition spark via the main chamber spark plug, and the third sub-mode of the third ignition mode includes providing a first, earlier ignition spark via the main chamber spark plug and a second, later ignition spark via the pre-chamber spark plug. For plot 1008, the vertical axis shows the EGR valve position from fully closed ("closed") to fully open ("open").

At time t0, the engine load (plot 1004) is below the lower threshold engine load (dashed line 1012), the commanded cylinder AFR (plot 1006) is rich relative to stoichiometry (dashed line 1014), and the EGR valve position (plot 1008) is closed. Based on these engine operating conditions, the controller selects the first ignition mode (plot 1002), which includes firing the main chamber spark plug of each cylinder during the compression stroke of the cylinder to provide ignition. This also results in the pre-chamber spark plug of each cylinder firing a waste spark during the exhaust stroke of the cylinder due to the multiplexed spark signal, such as elaborated above with respect to FIGS. 5A and 5B. The engine operates in the first ignition mode between time t0 and time t1.

At time t1, the engine load (plot 1004) increases above the lower threshold engine load (dashed line 1012), the commanded cylinder AFR (plot 1006) increases to stoichiometry (dashed line 1014), and the EGR valve is partially opened (plot 1008). Based on these engine operating conditions at time t1, the controller selects the second sub-mode of the third ignition mode (plot 1002). As a result, during the compression stroke of a given cylinder, the pre-chamber spark plug is fired to provide a first ignition spark followed by the main chamber spark plug to provide a second ignition spark, as elaborated above with respect to FIGS. 8A and 8B. Because of the spark signal multiplexing, during the exhaust stroke of a given cylinder, the main chamber spark plug fires a first waste spark followed by the pre-chamber spark plug firing a second waste spark. The engine operates in the second sub-mode of the third ignition mode between time t1 and time t2.

At time t2, the engine load (plot 1004) increases above the higher threshold engine load (dashed line 1010), the commanded cylinder AFR (plot 1006) becomes lean relative to stoichiometry (dashed line 1014), and the EGR valve remains partially open (plot 1008). Based on these engine operating conditions at time t2, the controller selects the second ignition mode. Therefore, the pre-chamber spark plug of each cylinder is fired during the compression stroke of the cylinder to provide the ignition spark, and the main chamber spark plug of each cylinder is fired during the exhaust stroke of the cylinder, providing a waste spark, as elaborated above with respect to FIGS. 6A and 6B. The engine operates in the second ignition mode between time t2 and time t3.

At time t3, the engine load (plot 1004) falls below the higher threshold engine load (dashed line 1010) and remains above the lower threshold engine load (dashed line 1012). Further, the commanded cylinder AFR (plot 1006) is stoichiometry (dashed line 1014), and the EGR valve is further opened (plot 1008) relative to the EGR valve position at time t2. Based on these engine operating conditions at time t3, the controller selects the first sub-mode of the third ignition mode. As a result, during the compression stroke of a given cylinder, the main chamber spark plug and the pre-chamber spark plug of the cylinder are fired substantially simultaneously to provide two simultaneous ignition sparks, as elaborated above with respect to FIGS. 7A and 7B. Because spark signals are multiplexed, simultaneous waste sparks are fired during the exhaust stroke of each cylinder, one by the main chamber spark plug and one by the pre-chamber spark plug. The cylinder continues to operate in the first sub-mode of the third ignition mode between time t3 and time t4.

At time t4, the engine load (plot 1004) falls below the lower threshold engine load (dashed line 1012), the commanded cylinder AFR (plot 1006) increases relative to stoichiometry and becomes lean (dashed lined 1014), and the EGR valve remains open (plot 1008). Based on these engine operating conditions at time t4, the controller selects the third sub-mode of the third ignition mode. As such, during the compression stroke of each cylinder, a first ignition spark is provided by the main chamber spark plug followed by a second ignition spark from the pre-chamber spark plug, such as elaborated above with respect to FIGS. 9A and 9B. Because of the multiplexed spark signal, two waste sparks are fired during the exhaust stroke of each cylinder: a first waste spark from the pre-chamber spark plug followed by a second waste spark from the main chamber spark plug. The engine continues to operate in the third sub-mode of the second ignition mode after time t4.

In this way, a system including a multiplexed pre-chamber and main chamber ignition system may be operated in a plurality of modes based on engine operating conditions in order to provide desired combustion characteristics for a desired engine performance. Providing ignition via a main chamber spark plug may increase performance during certain engine operating conditions, such as low load conditions, while providing ignition via a pre-chamber spark plug may decrease emissions during higher load conditions. By multiplexing a pre-chamber spark plug of a first cylinder to a main chamber spark plug of a second cylinder and multiplexing a main chamber spark plug of the first cylinder to a pre-chamber spark plug of the second cylinder, a total number of ignition coils included in the system may be decreased, reducing cost and complexity. Further, by adjusting relative spark timings of the pre-chamber spark plug and the main chamber spark plug based on engine operating conditions, a cylinder burn rate may be increased, which may increase a power output and a fuel efficiency of the engine.

The technical effect of multiplexing a pre-chamber spark plug of a first cylinder with a main chamber spark plug of a second cylinder is that efficient ignition can be achieved over a wide range of operating conditions while a number of ignition coils is decreased.

As one example, a method comprises: multiplexing spark signals to a first spark plug and a second spark plug, the first spark plug coupled to a pre-chamber of a first cylinder and the second spark plug coupled to a main chamber of a second cylinder. In the preceding example, the method additionally or optionally, multiplexing spark signals to the first spark plug and the second spark plug includes actuating both of the first spark plug and the second spark plug via a first ignition coil. In one or both of the preceding examples, additionally or optionally, the method further comprises multiplexing spark signals to a third spark plug and a fourth spark plug, the third spark plug coupled to a main chamber of the first cylinder and the fourth spark plug coupled to a pre-chamber of the second cylinder. In any or all of the preceding examples, additionally or optionally, multiplexing spark signals to the third spark plug and the fourth spark plug includes actuating both of the third spark plug and the fourth spark plug via a second ignition coil. In any or all of the preceding examples, additionally or optionally, the method further comprises actuating the first ignition coil at a first engine position of an engine cycle and actuating the second ignition coil at a second engine position of the engine cycle, a number of crank angle degrees between the first engine position and the second engine position determined based on engine operating conditions. In any or all of the preceding examples, additionally or optionally, the first engine position is during a compression stroke of the first cylinder and an exhaust stroke of the second cylinder, and actuating the first ignition coil at the first engine position includes providing an ignition spark to the first cylinder via the first spark plug and providing a waste spark to the second cylinder via the second spark plug. In any or all of the preceding examples, additionally or optionally, the second engine position is during an exhaust stroke of the first cylinder and a compression stroke of the second cylinder, and actuating the second ignition coil at the second engine position includes providing a waste spark to the first cylinder via the third spark plug and providing an ignition spark to the second cylinder via the fourth spark plug. In any or all of the preceding examples, additionally or optionally, the second engine position is during the compression stroke of the first cylinder and the exhaust stroke of the second cylinder, and actuating the second ignition coil at the second engine position includes providing a second ignition spark to the first cylinder via the third spark plug and providing a second waste spark to the second cylinder via the fourth spark plug. In any or all of the preceding examples, additionally or optionally, the first engine position is during an exhaust stroke of the first cylinder and a compression stroke of the second cylinder, and actuating the first ignition coil at the first engine position includes providing a waste spark to the first cylinder via the first spark plug and providing an ignition spark to the second cylinder via the second spark plug. In any or all of the preceding examples, additionally or optionally, the second engine position is during a compression stroke of the first cylinder and an exhaust stroke of the second cylinder, and actuating the second ignition coil at the second engine position includes providing an ignition spark to the first cylinder via the third spark plug and providing a waste spark to the second cylinder via the fourth spark plug. In any or all of the preceding examples, additionally or optionally, the second engine position is during the exhaust stroke of the first cylinder and the compression stroke of the second cylinder, and actuating the second ignition coil at the second engine position includes providing a second waste spark to the first cylinder via the third spark plug and providing a second ignition spark to the second cylinder via the fourth spark plug.

As another example, a method comprises: determining actuation timings of a first ignition coil and a second ignition coil based on engine operating conditions, the first ignition coil coupled to a pre-chamber spark plug of a first engine cylinder and a main chamber spark plug of a second engine cylinder and the second ignition coil coupled to a main chamber spark plug of the first engine cylinder and a pre-chamber spark plug of a second engine cylinder; actuating the first ignition coil and the second ignition coil at the determined actuation timing; and adjusting a pre-chamber fuel amount based on the determined actuation timing. In the preceding example, additionally or optionally, determining the actuation timings of the first ignition coil and the second ignition coil based on the engine operating conditions includes: responsive to at least one of an engine load below a threshold engine load and an engine temperature below a threshold engine temperature, determining a first actuation timing of the first ignition coil during the compression stroke of the second engine cylinder and determining a first actuation timing of the second ignition coil during the compression stroke of the first engine cylinder. In one or both of the preceding examples, additionally or optionally, determining the actuation timings of the first ignition coil and the second ignition coil based on the engine operating conditions includes: responsive to an engine load above a threshold engine load and an engine temperature above a threshold engine temperature, determining a first actuation timing of the first ignition coil during the compression stroke of the first engine cylinder and determining a first actuation timing of the second ignition coil during the compression stroke of the second engine cylinder. In any or all of the preceding examples, additionally or optionally, determining the actuation timings of the first ignition coil and the second ignition coil based on the engine operating conditions further includes: responsive to at least one of an exhaust gas recirculation (EGR) rate above a threshold EGR rate and a desired air-fuel ratio (AFR) above a threshold desired AFR, determining a second actuation timing of the first ignition coil during the compression stroke of the second engine cylinder and determining a second actuation timing of the second ignition coil during the compression stroke of the first engine cylinder.

As another example, a system comprises: an engine including a plurality of cylinders, each cylinder including a pre-chamber, the pre-chamber including a pre-chamber spark plug directly coupled thereto, and further including a main chamber spark plug directly coupled to the cylinder; an ignition system including a plurality of ignition coils, the plurality of ignition coils including a first ignition coil electrically coupled to the main chamber spark plug of a first cylinder and to the pre-chamber spark plug of a second cylinder and a second ignition coil electrically coupled to the main chamber spark plug of the second cylinder and the pre-chamber spark plug of the first cylinder; and a controller storing executable instructions in non-transitory memory that, when executed, cause the controller to: select between operating in a first ignition mode, a second ignition mode, and a third ignition mode based on engine operating conditions, the first ignition mode including providing ignition via the main chamber spark plug only, the second ignition mode including providing ignition via the pre-chamber spark plug only, and the third ignition mode including providing ignition via both the main chamber spark plug and the pre-chamber spark plug. In the preceding example, additionally or optionally, engine operating conditions include engine speed, engine load, an exhaust gas recirculation (EGR) rate, a desired air-fuel ratio (AFR), and engine temperature. In one or both of the preceding examples, additionally or optionally, to operate in the first ignition mode, the controller stores further instructions in non-transitory memory that, when executed, cause the controller to: actuate the first ignition coil during a compression stroke of the first cylinder while the first cylinder is fueled, the second cylinder is unfueled, and the pre-chamber of each cylinder is unfueled; and actuate the second ignition coil during a compression stroke of the second cylinder while the second cylinder is fueled, the first cylinder is unfueled, and the pre-chamber of each cylinder is unfueled. In any or all of the preceding examples, additionally or optionally, to operate in the second ignition mode, the controller stores further instructions in non-transitory memory that, when executed, cause the controller to: actuate the second ignition coil during a compression stroke of the first cylinder while both first cylinder and the pre-chamber of the first cylinder are fueled and both the second cylinder and the pre-chamber of the second cylinder are unfueled; and actuate the first ignition coil during a compression stroke of the second cylinder while both the second cylinder and the pre-chamber of the second cylinder are fueled and both the first cylinder and the pre-chamber of the first cylinder are unfueled. In any or all of the preceding examples, additionally or optionally, to operate in the third ignition mode, the controller stores further instructions in non-transitory memory that, when executed, cause the controller to: actuate both of the first ignition coil and the second ignition coil during a compression stroke of the first cylinder while both first cylinder and the pre-chamber of the first cylinder are fueled and the pre-chamber of the second cylinder is unfueled; and actuate both of the first ignition coil and the second ignition coil during a compression stroke of the second cylinder while both the second cylinder and the pre-chamber of the second cylinder are fueled and both the first cylinder and the pre-chamber of the first cylinder are unfueled.

In another representation, a method comprises: during an engine cycle, adjusting a delay between actuating a first ignition coil and a second ignition coil based on engine operating conditions, the first ignition coil providing a first ignition spark to a first cylinder via a first spark plug and a first waste spark to a second cylinder via a second spark plug, the second ignition coil providing a second ignition spark to the first cylinder via a third spark plug and a second waste spark to the second cylinder via a fourth spark plug. In the preceding example, additionally or optionally, one of the first spark plug and the third spark plug is coupled to a pre-chamber of the first cylinder and the other is coupled directly to the first cylinder, and one of the second spark plug and the fourth spark plug is coupled to a pre-chamber of the second cylinder and the other is coupled directly to the second cylinder. In one or both of the preceding examples, additionally or optionally, the compression stroke of the first cylinder and an exhaust stroke of the second cylinder occur at a first engine position, and the exhaust stroke of the first cylinder and a compression stroke of the second cylinder occur at a second engine position. In any or all of the preceding examples, additionally or optionally, the delay is a number of crank angle degrees between actuating the first ignition coil and the second ignition coil. In any or all of the preceding examples, additionally or optionally, the engine operating conditions include engine speed, engine load, an exhaust gas recirculation (EGR) rate, a desired air-fuel ratio (AFR), and engine temperature. In any or all of the preceding examples, additionally or optionally, adjusting the delay between actuating a first ignition coil and a second ignition coil based on engine operating conditions includes adjusting the delay to a positive, non-zero number less in magnitude than the number of crank angle degrees between the first engine position and the second engine position responsive to an engine transient from high engine load to low engine load exceeding a threshold engine transient from high engine load to low engine load. In any or all of the preceding examples, additionally or optionally, adjusting the delay between actuating a first ignition coil and a second ignition coil based on engine operating conditions includes adjusting the delay to a negative, non-zero number less in magnitude than the number of crank angle degrees between the first engine position and the second engine position responsive to an EGR rate above a threshold EGR rate. In any or all of the preceding examples, additionally or optionally, adjusting the delay between actuating a first ignition coil and a second ignition coil based on engine operating conditions includes adjusting the delay to zero responsive to the engine temperature exceeding a threshold engine temperature.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-7, I-4, I-7, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an ignition system of an engine, comprising:

during an engine cycle, adjusting a delay between actuating a first ignition coil and a second ignition coil based on engine operating conditions, the first ignition coil providing a first ignition spark to a first cylinder via a first spark plug and a first waste spark to a second cylinder via a second spark plug, the second ignition coil providing a second ignition spark to the first cylinder via a third spark plug and a second waste spark to the second cylinder via a fourth spark plug, where one of the first spark plug and the third spark plug is coupled to a pre-chamber of the first cylinder and the other is coupled directly to the first cylinder, and one of the second spark plug and the fourth spark plug is coupled to a pre-chamber of the second cylinder and the other is coupled directly to the second cylinder.

2. The method of claim 1, where a compression stroke of the first cylinder and an exhaust stroke of the second cylinder occur at a first engine position, and an exhaust stroke of the first cylinder and a compression stroke of the second cylinder occur at a second engine position.

3. The method of claim 2, where the delay is an actual total number of crankshaft angle degrees between actuating the first ignition coil and the second ignition coil.

4. The method of claim 3, where the engine operating conditions include engine speed, engine load, an exhaust gas recirculation (EGR) rate, a desired air-fuel ratio (AFR), and engine temperature.

5. The method of claim 3, where adjusting the delay between actuating the first ignition coil and the second ignition coil based on the engine operating conditions includes adjusting the delay between actuating the first ignition coil and the second ignition coil to a positive, non-zero number less in magnitude than the actual total number of crankshaft angle degrees between the first engine position and the second engine position responsive to an engine transient from a first engine load to a second engine load exceeding a threshold engine transient from the first engine load to the second engine load, the first engine load greater than the second engine load.

6. The method of claim 3, where adjusting the delay between actuating the first ignition coil and the second ignition coil based on the engine operating conditions includes adjusting the delay between actuating the first ignition coil and the second ignition coil to a negative, non-zero number less in magnitude than the actual total number of crankshaft angle degrees between the first engine position and the second engine position responsive to an EGR rate above a threshold EGR rate.

7. The method of claim 3, where adjusting the delay between actuating the first ignition coil and the second ignition coil based on engine operating conditions includes adjusting the delay between actuating the first ignition coil and the second ignition coil to zero responsive to the engine temperature exceeding a threshold engine temperature.

8. A system, comprising:
an engine including a plurality of cylinders, each cylinder including a pre-chamber, the pre-chamber including a pre-chamber spark plug directly coupled thereto, and further including a main chamber spark plug directly coupled to the cylinder;
an ignition system including a plurality of ignition coils, the plurality of ignition coils including a first ignition coil electrically coupled to the main chamber spark plug of a first cylinder and to the pre-chamber spark plug of a second cylinder and a second ignition coil electrically coupled to the main chamber spark plug of the second cylinder and the pre-chamber spark plug of the first cylinder; and
a controller storing executable instructions in non-transitory memory that, when executed, cause the controller to:
generate spark in at least one of a main chamber or a pre-chamber of the first cylinder, and to generate spark in at least one of a main chamber or a pre-chamber of the second cylinder.

9. The system of claim 8, further comprising additional instructions that cause the controller to actuate the first ignition coil during a compression stroke of the first cylinder while the first cylinder is fueled, the second cylinder is unfueled, and the pre-chamber of each cylinder is unfueled; and
actuate the second ignition coil during a compression stroke of the second cylinder while the second cylinder is fueled, the first cylinder is unfueled, and the pre-chamber of each cylinder is unfueled.

10. The system of claim 8, further comprising additional instructions that cause the controller to generate a first spark in the pre-chamber of the first cylinder and generate a second spark in the main chamber of the first cylinder during a cycle of the first cylinder.

11. The system of claim 10, where the first spark is generated in the pre-chamber during an intake stroke of the first cylinder.

12. The system of claim 10, where the second spark is generated in the main chamber during a compression stroke of the first cylinder.

13. The system of claim 10, where the first spark is generated in the pre-chamber during a compression stroke of the first cylinder.

14. The system of claim 13, where the second spark is generated in the main chamber during the compression stroke.

15. The system of claim 14, where the second spark is generated after the first spark during the compression stroke.

16. The system of claim 10, where the first spark is generated in the pre-chamber during an exhaust stroke of the first cylinder.

17. The system of claim 16, where the second spark is generated in the main chamber during the exhaust stroke of the first cylinder.

18. The system of claim 17, where the second spark is generated before the first spark during the cycle of the first cylinder.

* * * * *